(12) United States Patent
Akimoto et al.

(10) Patent No.: US 7,155,127 B2
(45) Date of Patent: Dec. 26, 2006

(54) OPTICAL COMMUNICATION SYSTEM, OPTICAL COMMUNICATION UNIT, AND OPTICAL TRANSCEIVING PACKAGE

(75) Inventors: Koji Akimoto, Yokosuka (JP); Jun-ichi Kani, Yokohama (JP); Mitsuhiro Teshima, Yokosuka (JP); Katsumi Iwatsuki, Yokohama (JP); Masaki Fukui, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 729 days.

(21) Appl. No.: 10/218,721

(22) Filed: Aug. 14, 2002

(65) Prior Publication Data

US 2003/0039010 A1 Feb. 27, 2003

(30) Foreign Application Priority Data

Aug. 15, 2001 (JP) .......................... P2001-246549

(51) Int. Cl.
*H04J 14/00* (2006.01)

(52) U.S. Cl. .......................... 398/72; 398/67; 398/68; 398/71; 398/70; 398/79; 398/91; 398/92; 398/135; 398/139; 398/141; 398/158; 398/159; 398/153; 398/154; 398/202; 398/208; 398/214; 398/182; 398/183; 398/184; 398/192; 398/193; 398/194; 385/24; 385/37

(58) Field of Classification Search ............... 385/24, 385/37; 398/67, 68, 214, 70, 208, 71, 202, 398/72, 194, 79, 193, 91, 182, 92, 183, 135, 398/192, 139, 159, 141, 158, 154, 153

See application file for complete search history.

(56) References Cited

U.S. PATENT DOCUMENTS

| 5,065,396 A | 11/1991 | Castellano et al. |
| 6,081,523 A | 6/2000 | Merchant et al. |
| 6,532,320 B1 * | 3/2003 | Kikuchi et al. ............... 385/24 |

(Continued)

FOREIGN PATENT DOCUMENTS

JP S50-127504 10/1975

(Continued)

OTHER PUBLICATIONS

N. Takachio, et al., "Wide area gigabit access network based on 12.5 Ghz spaced channel super-dense WDM technologies" IEE Electronics Letters, Mar. 1, 2001, vol. 37, No. 5, pp. 309-311.

(Continued)

*Primary Examiner*—Hanh Phan
(74) *Attorney, Agent, or Firm*—Darby & Darby

(57) ABSTRACT

Cost-reduction in an optical communication unit is achieved by using spectrum-sliced modulated broadband light for transmitting upstream signals, instead of using laser light. An optical communication system includes at least one pair of optical communication units that each has a bi-directional network interface in which physical bit rates of transmission signals and reception signals are identical, an optical transmitter, and an optical receiver, and that performs bi-directional transmissions via at least one optical fiber. One optical communication unit includes a physical bit rate down-converter that lowers the physical bit rate of transmission signals from the bi-directional network interface and outputs to the optical transmitter, and the other optical communication unit includes a physical bit rate up-converter that raises the physical bit rate of signals received by the optical receiver and outputs to the bi-directional network interface. These optical communication units are also applicable to wavelength-division multiplexing systems.

12 Claims, 20 Drawing Sheets

U.S. PATENT DOCUMENTS

| | | | |
|---|---|---|---|
| 6,597,482 B1 * | 7/2003 | Chung et al. | 398/87 |
| 6,690,682 B1 * | 2/2004 | Giaretta et al. | 370/535 |
| 6,885,681 B1 * | 4/2005 | Tanaka et al. | 370/503 |

FOREIGN PATENT DOCUMENTS

| | | | |
|---|---|---|---|
| JP | 03-195286 A | | 8/1991 |
| JP | 04-211534 | | 8/1992 |
| JP | 05-167731 | | 7/1993 |
| JP | 7-177127 | | 7/1995 |
| JP | 8-008878 | | 1/1996 |
| JP | 8-237223 | | 9/1996 |
| JP | H09-130263 | A2 | 5/1997 |
| JP | 9-214440 | | 8/1997 |
| JP | 11-187051 | | 7/1999 |
| JP | 11-234361 | | 8/1999 |
| JP | 2000-196536 | | 7/2000 |
| JP | 2001-045069 | | 2/2001 |
| JP | 2002-082323 | | 3/2002 |
| JP | 2002-156616 | | 5/2002 |

OTHER PUBLICATIONS

Takuya Nakamura, et al., "A Study of Transmission Characteristics of Reflected-type Wavelength Division Multiplexing-Passive Optical Network System in Optical Signal Levels", Technical Report of IEICE, OCS2000-50, The Institute of Electronics, Information and Communication Engineers, pp. 13-18, Sep. 2000.

M. Zirngibl, et al., "LARNet, a Local Access Router Network" IEEE Photonics Technology Letters, vol. 7, No. 2, Feb. 1995, pp. 215-217.

Stuart S. Wagner, et al., "Technology and System Issues for a WDM-Based Fiber Loop Archtecture" Journal of Lightwave Technology, vol. 7, No. 11, Nov. 1989, pp. 1759-1768.

S.S. Wagner et al., "Experimental Demonstration of a Passive Optical Subscriber Loop Architecture", IE Electronics Letters, Mar. 17, 1988, vol. 24, No. 6, pp. 344-346.

Jun-ichi Kani, et al., "100 Mbps/1 Gbps asymmetric bandwidth wide-area access network based on super-dense WDM technologies", 7th Asian-Pacific Conference on Communications (APCC2001), pp. 388-391, Tokyo (Japan), Sep. 2001.

Japanese Office Action for JP 2002-231632 mailed on Jan. 24, 2006.

* cited by examiner

OPTICAL COMMUNICATION SYSTEM, OPTICAL COMMUNICATION UNIT, AND OPTICAL TRANSCEIVING PACKAGE

BACKGROUND OF THE INVENTION

1. Field of the Invention

The present invention relates to an optical communication system, an optical communication unit, and an optical transceiving package that form an optical access network, and particularly, a wavelength-division multiplexing access network.

2. Description of the Related Art

FIG. 16 shows a structural example of an Ethernet-based access system. In FIG. 16, a plurality of subscriber units 1051 and an Ethernet switch/router 1053 located in a center unit 1052 are connected together respectively via one or two optical fibers 1031 so as to enable bi-directional transmissions to be performed. Here, a Fast Ethernet having a physical bit rate of 125 Mbps and a maximum throughput of 100 Mbps, and a Gigabit Ethernet having a physical bit rate of 1.25 Gbps and a maximum throughput of 1 Gbps or the like are assumed. Note that the term physical bit rate refers to the rate at which electrical signals or optical signals are physically switched on and off, regardless of the actual throughput.

FIG. 17 shows a structural example of a wavelength-division multiplexing access network. In FIG. 17, a plurality of subscriber units 1051 and a center unit 1052 are connected via optical fibers 1031, an optical splitter unit 1056, and an optical fiber 1032. An arrayed waveguide grating (AWG) filter 1057 of the optical splitter unit 1056 multiplexes upstream optical signals from each of the subscriber units 1051 and transmits them to the center unit 1052. In addition, the AWG filter 1057 demultiplexes downstream wavelength-division multiplexed optical signals transmitted from the center unit 1052 into each wavelength and transmits them to each subscriber unit 1051. The arrayed waveguide grating (AWG) filter 1054 of the center unit 1052 demultiplexes the upstream wavelength-division multiplexed optical signals multiplexed by the optical splitter unit 1056 into each wavelength, and transmits them to an Ethernet switch/router 1053. In addition, the AWG filter 1054 wavelength-division multiplexes downstream optical signals from the Ethernet switch/router 1053 that are addressed to each subscriber unit 1051, and transmits them to the optical splitter unit 1056.

Note that the structure shown in FIG. 17 is just an example, and it is also possible to employ a structure in which two optical fibers are used in order to separate the upstream optical transmission path from the downstream optical transmission path, and the upstream signals and the downstream signals are multiplexed or demultiplexed by separate arrayed waveguide grating filters.

It should be noted that research is proceeding on wavelength-division multiplexing access networks on the assumption that each subscriber unit transmits an optical signal of a different wavelength from the other subscriber units. However, recently, a scheme (see Document 1 (K. Akimoto, et al., "Spectrum-sliced 25-GHz spaced, 155 Mbps×32 channel WDM access", Proc. CLEO/Pacific Rim 2001, ThB1-5, pp. II-556-II-557, Chiba (Japan), July, 2001)) is being investigated in which each subscriber unit transmits modulated broadband light, and its spectrum is sliced by an arrayed waveguide grating (AWG) filter of the optical splitter unit into different wavelengths allocated to each subscriber unit. The spectrum-sliced light of each wavelength is then wavelength-division multiplexed and transmitted to the center unit. As a result of this scheme, it is possible for the wavelength-division multiplexing access network to employ each subscriber unit using an optical transmitter having the same specifications. This allows the optical transmitter production costs and the costs of wavelength control to be reduced.

FIG. 18 shows a structural example of a wavelength-division multiplexing access network based on spectrum-slicing techniques. The basic structure is the same as that shown in FIG. 17; however, here, the upstream optical transmission is shown.

A broadband light source (not shown) that generates broadband spontaneous emissions (ASE) is provided in each subscriber unit 1051. Note that a subscriber unit may also be called an optical network unit (ONU). Examples of the broadband light source include light emitting diodes (LED), super-luminescent diodes (SLD), semiconductor optical amplifiers (SOA), and optical fiber amplifiers. LED, SLD, and SOA are semiconductor devices that are able to perform direct modulation. Therefore, when used as a transmitter, they are able to output the modulated ASE without external modulators. However, in the case of an optical fiber amplifier, it is necessary to modulate a spontaneous emission using an external modulator. Such modulated spontaneous emissions are known as "modulated broadband light". The modulated broadband light output by each subscriber unit 1051 is shown by (a) in FIG. 19.

The arrayed waveguide grating filter 1057 of the optical splitter unit 1056 receives the modulated broadband light transmitted from each subscriber unit 1051 via the respective optical fiber 1031. Optical signals obtained by spectrum-slicing (spectrum-sliced light) are wavelength-division multiplexed, and transmitted to the center unit 1052 via the optical fiber 1032. The wavelength-division multiplexed spectrum-sliced light when there are 64 subscriber units 1051 is shown in (b) in FIG. 19. The arrayed waveguide grating filter 1054 of the center unit 1052 demultiplexes wavelength-division multiplexed optical signals transmitted via the optical fiber 1032 for each wavelength allocated to each subscriber unit.

However, as is also described in the Document 1, the transmittable signal rate when a spectrum-slicing scheme is used is limited by the filter characteristics (transmission spectral width) of the arrayed waveguide grating filter 1057 of the optical splitter unit 1056. This is because spontaneous emission is used instead of laser light for the optical carriers.

When spontaneous emission is transmitted, the beat noise generated by the interference between each spectral component of the spontaneous emission causes the signal-to-noise ratio to be degraded. FIGS. 20A to 20D show the results of a numerical calculation for explaining the effect of beat noise when using spectrum-slicing. FIG. 20A shows the computer-simulated optical spectrum of the white light that has a flat optical spectrum. FIG. 20B shows a temporal waveform after the spontaneous emission has been received by a 200 GHz bandwidth optical receiver. FIG. 20C shows an optical spectrum when a spontaneous emission having a flat spectrum is sliced using a 25 GHz full width at a half maximum arrayed waveguide grating filter. FIG. 20D shows a temporal waveform after the spectrum-sliced light has been received by a 200 GHz bandwidth optical receiver.

The beat noise generated by the white light (FIG. 20A) has such frequency characteristics that the spectrum is widely distributed from the low frequencies to approximately the same high frequencies as the optical spectral width (bandwidth). When this beat noise is received by the optical receiver that has an extremely narrow bandwidth relative to the optical bandwidth, most of the beat noise components are removed by this optical receiver, resulting in a relatively low noise temporal waveform, such as is shown in FIG. 20B, being obtained.

In contrast, the beat noise generated by the spectrum-sliced light (FIG. 20C) has such frequency characteristics that the spectrum is distributed from the low frequencies to approximately the same frequency as the bandwidth of the arrayed waveguide grating filter. When the bandwidth of the arrayed waveguide grating filter is approximately the same or less than as the bandwidth of the optical receiver, most of the beat noise components are not removed by the optical receiver, resulting in temporal waveforms having high intensity noise, as is shown in FIG. 20D.

In order to increase the number of subscriber units that can be accommodated in a wavelength-division multiplexing access network, it is necessary to narrow the wavelength spacing (this is known as the channel spacing) between wavelength-division multiplexed optical signals (or spectrum-sliced light). Therefore, it has been necessary to narrow the spectral width occupied by each channel, resulting in the transmittable rate for each subscriber being reduced.

A quantitative analysis of the above characteristics is found in Document 2 (J. S. Lee et al., "Spectrum-sliced fiber amplifier light source for multichannel WDM applications", IEEE Photonics Technologies Letters, Vol. 5, pp. 1458–1461, 1993). This document describes how the signal-to-noise ratio can be determined as being approximately Bo/Be using the full width at a half maximum Bo of the arrayed waveguide grating filter and the electrical bandwidth Be of the optical receiver. A signal-to-noise ratio of approximately 144 or more corresponds to a bit-error rate of $10^{-9}$ or less, which is the transmission quality standard. For example, the rate that can be transmitted by spectrum-sliced light is restricted to approximately 170 Mbps in a 25-GHz spaced wavelength-division multiplexing system, on the assumption that the bandwidth of the optical receiver needs to be approximately 0.7 times the desired transmission rate, and the full width at a half maximum of the arrayed waveguide grating filter is approximately 0.7 times the channel spacing. Furthermore, when optical leakage from the other channels in the arrayed waveguide grating filter is considered, the transmittable rate using spectrum-slicing in a 25-GHz spaced wavelength-division multiplexing system is approximately 125 to 155 Mbps, which is described in the Document 1.

Here, if an attempt is made to transmit a 1.25 Gbps signal in a spectrum-sliced, 25-GHz spaced wavelength-division multiplexing system, the obtained signal-to-noise ratio is approximately 16 as the full width at half a maximum of the arrayed waveguide grating filter 1057 is approximately 0.7 times the channel spacing. This corresponds to a bit-error rate of above 0.01 so that, for example, there is practically 100% loss for a packet length of 16 bytes or more.

On the other hand, for a downstream optical transmission, in the center unit 1052, a reduction in cost is made possible using simultaneous wavelength control of multiple wavelengths (multiple channels), and multi-wavelength light sources (Japanese Unexamined Patent Application, First Publication No. 2002-82323; Document 3 (M. Fujiwara et al., "Flattened optical multicarrier generation of 12.5 GHz spaced 256 channels based on sinusoidal amplitude and phase hybrid modulation", Electronics Letters, Vol. 37, No. 15, pp. 967–968, July, 2001)) and the like. Therefore, there is not the same need for the application of spectrum-slicing for upstream optical transmission. Here, the multi-wavelength light sources of Japanese Unexamined Patent Application, First Publication No. 2002-82323 and Document 3 are structured such that a dual multiplexing/modulating processing is performed by dividing into two the input light from 2n number of light sources that each generate light having a different single center wavelength, performing polarization combining on modulation results, and separating these into a plurality of carriers having different wavelengths so as to obtain the final output. Moreover, the multi-wavelength light sources of Japanese Unexamined Patent Application, First Publication No. 2002-82323 and Document 3 are structured such that phase modulation and amplitude modulation are performed on light having a single center wavelength using an electronic signal (for example, a sinusoidal wave) having a specific repetition rate, and multi-wavelength light having a plurality of center wavelengths is generated simultaneously by generating side bands.

With regard to the transmission rate, it is possible to transmit at least signals of 1.25 Gbps rate per channel (wavelength) using the multi-wavelength light sources of Japanese Unexamined Patent Application, First Publication No. 2002-82323 and Document 3, and this is made known in Document 4 (N. Takachio et al., "Wide area gigabit access network based on 12.5 GHz spaced 256 channel super-dense WDM technologies", Electronics Letters, Vol. 37, pp. 309–310, March, 2001).

Accordingly, for example, as a scheme constructing a low-cost 25-GHz spaced wavelength-division multiplexing access network, if a spectrum-slicing scheme is used for the upstream signal transmission and a multi-wavelength light source is used for the downstream signal generation, then while the upstream transmission rate is restricted to approximately 155 Mbps or less, it is possible to provide a downstream transmission rate in the gigabit class. This enables a system to be achieved that is suitable for the downloading of a variety of contents files and the like.

In addition, as a different approach in a scheme for reducing the cost of upstream optical transmission, a carrier supply type of wavelength-division multiplexing access network is proposed in which an optical carrier for an upstream optical signal is supplied to each of a subscriber unit from the center unit, and a transmission is performed by modulating the optical carrier supplied to the subscriber unit (Japanese Unexamined Patent Application, First Publication No. 2000-196536, Document 5 (Takuya Nakamura et al., "A Study of Transmission Characteristics of Reflected-type Wavelength Division Multiplexing-Passive Optical Network System in Optical Signal Levels", Technical Report of IEICE, OCS2000-50, pp. 13–18, September, 2000)). FIG. 21 shows an example of the structure of a carrier supply type of wavelength-division multiplexing access network.

In FIG. 21, a center unit 1152 is formed by a transmitting section 1160 and a receiving section 1161. The transmitting section 1160 is formed by a multi-wavelength generation/modulation section 1162 that generates downstream optical signals, a multi-wavelength generation section 1163 that generates optical carriers for the upstream optical signals, and a wavelength-division multiplexing (WDM) filter 1164 that multiplexes multi-wavelength light output from the multi-wavelength generation/modulation section 1162 and multi-wavelength generation section 1163.

Downstream optical signals from the center unit 1152 are sent to an optical splitter unit 1156 to which the center unit 1152 is connected via an optical fiber 1132. The downstream optical signals are demultiplexed for each wavelength by an AWG 1157 inside the optical splitter unit 1156, and are sent to the respective subscriber units 1151 via optical fibers 1131. They are then received by a receiver 1170 inside each subscriber unit 1151.

The optical carriers for upstream optical signals generated by the multi-wavelength generation section 1163 are sent to an AWG 1157 of the optical splitter unit 1156 along the same path as the downstream optical signals sent from the center unit 1152 to the subscriber units 1151. The AWG 1157 demultiplexes both the downstream optical signals and the optical carriers for each wavelength and sends them to the subscriber units 1151. In the subscriber units 1151, the downstream optical signals and the optical carriers are separated by a WDM filter 1171 and the optical carriers are input into optical modulators 1172. The optical modulators 1172 modulate the optical carriers to generate upstream optical signals. These are then sent to an AWG 1157 to which the optical modulators 1172 are connected via optical fibers 1141. The AWG 1157 performs wavelength-division multiplexing on the upstream optical signals from each subscriber unit 1151 and sends them to the center unit 1152 via the optical fiber 1142. The upstream optical signals are received by the receiving section 1161 of the center unit 1152.

Here, the wavelength arrangement is such that the downstream optical signals $\lambda_1, \lambda_2, \ldots, \lambda_N$ (downstream modulated light) and the optical carrier signals for the upstream optical signals $\lambda_1', \lambda_2', \ldots, \lambda_N'$ (non-modulated light, upstream modulated light) (wherein N is the number of subscriber units 1151) use different wavelength bands.

The advantage of a carrier supply type of wavelength-division multiplexing access network is that it is not necessary to have a laser light source inside the subscriber unit, so that, because wavelength control is not necessary in the subscriber unit, the structure of a transmitter in the subscriber unit is simplified and a lowering in the cost of the wavelength-division multiplexing access network can be expected.

In the Fast Ethernet and Gigabit Ethernet, which are currently the most widely used bi-directional optical networks, the upstream and downstream physical bit rates are the same.

Accordingly, in a wavelength-division multiplexing access network in which a low cost spectrum-slicing scheme is used for the upstream signal transmissions with the transmission rate being restricted to approximately 155 Mbps or less, and that is able to provide a transmission rate in the Gigabit class for the downstream, which should be sufficient for the requirements of the subscriber, it is not possible for the aforementioned Fast Ethernet and Gigabit Ethernet signals to be transmitted in their existing state. This is because if Fast Ethernet is used it is not possible to make the downstream rate reach the Gigabit class, and if Gigabit Ethernet is used transmission of spectrum-sliced light is completely impossible due to the high rate of the upstream signals and the wide bandwidth.

If, however, a multi-wavelength light source is used as the light source for the upstream optical signals and downstream optical signals, if there is a fault in the light source unit there is a possibility that the optical carriers of all wavelengths will cease to operate. If this happens, a problem will arise in which all of the communications of all the subscriber units connected to the wavelength-division multiplexing access network will stop, thereby causing enormous damage.

SUMMARY OF THE INVENTION

It is an object of the present invention to provide an optical communication system, an optical communication unit, and an optical transceiving package that use a Gigabit Ethernet in which the upstream and downstream physical bit rates are the same as a widely used bi-directional optical network interface, that achieve a reduction in the cost of the optical communication unit by using a spectrum-slicing scheme or modulated broadband light for upstream signal transmissions, and that provide a transmission rate in the Gigabit class for downstream signal transmissions that may be sufficient for the requirements of the subscriber.

Furthermore, it is an object of the present invention to provide an optical communication system, an optical communication unit, and an optical transceiving package that use a Gigabit Ethernet in which the upstream and downstream physical bit rates are the same as a widely used bi-directional optical network interface, and that, by using multi-wavelength light sources concentrated in a center unit as light sources for both upstream signal transmissions and downstream signal transmissions, achieve a lowering in the cost of an optical communication unit that is able to provide a communication service whose transmission rates are in the gigabit class, and that are also able to provide communication at low speed even if the supply of optical carriers is stopped due to a fault in the light source unit.

An optical communication system according to a first aspect of the present invention comprises: at least one pair of optical communication units that each has a bi-directional network interface in which a physical bit rate of transmission signals and a physical bit rate of reception signals are identical, an optical transmitter, and an optical receiver, and that performs bi-directional transmissions via at least one optical fiber, wherein one optical communication unit is provided with a physical bit rate down-converter that lowers a physical bit rate of a transmission signal that is input from the bi-directional network interface in the one optical communication unit, and outputs the transmission signal to the optical transmitter in the one optical communication unit, and wherein the other optical communication unit is provided with a physical bit rate up-converter that raises a physical bit rate of a reception signal that is received by the optical receiver in the other optical communication unit, and outputs the reception signal to the bi-directional network interface of the other optical communication unit.

An optical communication system according to a second aspect of the present invention comprises: a plurality of subscriber side optical communication units that each has a subscriber side bi-directional network interface in which a physical bit rate of transmission signals and a physical bit rate of reception signals are identical, a subscriber side optical transmitter, a subscriber side optical receiver, and a subscriber side physical bit rate down-converter that lowers a physical bit rate of a transmission signal that is input from the subscriber side bi-directional network interface, and outputs the transmission signal to the subscriber side optical transmitter; a center side optical communication unit having a center side bi-directional network interface in which a physical bit rate of transmission signals and a physical bit rate of reception signals are identical, a plurality of center side optical transmitters and a plurality of center side optical receivers that correspond respectively to the plurality of subscriber side optical communication units, a wavelength multiplexing and demultiplexing section that performs wavelength-division multiplexing on optical signals output from the plurality of center side optical transmitters and transmits the multiplexed optical signals as downstream wavelength-division multiplexed optical signals, and demultiplexes into respective wavelengths input upstream wavelength-division multiplexed optical signals and causes the demultiplexed upstream signals to be received in the plurality of center side optical receivers, and a center side physical bit rate up-converter that raises a physical bit rate of a reception signal that is received by the center side optical receiver, and outputs the reception signal to the center side bi-directional network interface; and an optical splitter unit that is connected via at least one optical fiber to both the plurality of subscriber side optical communication units and the center side optical communication unit, and multiplexes optical signals from the plurality of subscriber side optical communication units and transmits the multiplexed optical signals to the center side optical communication unit as the upstream wavelength-division multiplexed optical signals, and that demultiplexes into respective wavelengths the downstream wavelength-division multiplexed optical signals from the center side optical communication unit and transmits the demultiplexed downstream signals to the plurality of subscriber side optical communication units.

An optical communication unit according to a first aspect of the present invention comprises: a bi-directional network interface in which a physical bit rate of transmission signals and a physical bit rate of reception signals are identical; an optical receiver that receives input optical signals and outputs reception signals to the bi-directional network interface; a physical bit rate down-converter that lowers a physical bit rate of transmission signals input from the bi-directional network interface and then outputs the transmission signals; an optical transmitter that converts the signals input from the physical bit rate down-converter into optical transmission signals and transmits the converted optical transmission signals.

An optical communication unit according to a second aspect of the present invention comprises: a bi-directional network interface in which a physical bit rate of transmission signals and a physical bit rate of reception signals are identical; an optical transmitter that converts the signals input from the bi-directional network interface into optical transmission signals and transmits the converted optical transmission signals; an optical receiver that receives input optical signals and outputs reception signals; and a physical bit rate up-converter that raises a physical bit rate of reception signals received by the optical receiver and then outputs the reception signals to the bi-directional network interface.

An optical transceiving package according to the present invention comprises: a bi-directional network interface in which a physical bit rate of transmission signals and a physical bit rate of reception signals are identical; an optical receiving section that receives input optical signals and outputs reception signals; a physical bit rate up-converter that raises a physical bit rate of the reception signals received by the optical receiver and then outputs the reception signals to the bi-directional network interface; a physical bit rate down-converter that lowers a physical bit rate of transmission signals input from the bi-directional network interface and then outputs the transmission signals; an optical transmitting section that transmits optical signals obtained by modulating optical carriers that have been input from outside the optical transceiving package or have been generated inside the optical transceiving package using transmission signals from the physical bit rate down-converter whose physical bit rate has been lowered; and a transmission-rate controller that controls physical bit rates to be lowered by the physical bit rate down-converter.

According to the present invention, because it is possible to reduce the physical bit rate of optical signals transmitted in one direction compared with optical signals transmitted in the other direction between optical communication units that each provided with a bi-directional network interface in which the physical bit rates of the reception signals and transmission signals are the same, bi-directional transmission is made possible between optical communication units even when transmission capacity in one direction cannot be guaranteed to be the same as the transmission capacity in the other direction.

Moreover, when the present invention is used in a wavelength-division multiplexing access network, while using an interface in which the physical bit rates of the reception signals and transmission signals are the same such as a Gigabit Ethernet that is a widely used bi-directional network interface, it is possible to achieve a wavelength-division multiplexing access network that achieves a lowering in the cost of an optical communication unit by using a spectrum-slicing scheme for upstream signal transmissions, and that also provides transmission rates in the Gigabit class for downstream signal transmissions that may be expected to be sufficient for the requirements of the subscriber.

In the optical communication system according to the second aspect of the present invention, the subscriber side optical communication unit may be further provided with: a subscriber side physical bit rate up-converter that raises a physical bit rate of reception signals received by the subscriber side optical receiver and outputs the reception signals to the subscriber side bi-directional network interface; and a subscriber side transmission-rate controller that controls a physical bit rate to be lowered by the subscriber side physical bit rate down-converter, and wherein the center side optical communication unit may be further provided with: a center side physical bit rate down-converter that lowers a physical bit rate of transmission signals input from the center side bi-directional network interface and outputs the transmission signals to the center side optical transmitter; and a center side transmission-rate controller that controls a physical bit rate to be lowered by the center side physical bit rate down-converter.

In addition, the center side optical communication unit may be provided with a multi-wavelength generation section that outputs optical carriers each having a different wavelength; and wherein the subscriber side optical communication unit and the center side optical communication unit may be provided with an input port into which the optical carriers are input; and wherein each of the subscriber side optical transmitters and the center side optical transmitters may be provided respectively with a subscriber side optical modulator and a center side optical modulator, and when the subscriber side optical modulator and the center side optical modulator are each receiving the optical carriers that are input via the input port from the multi-wavelength generation section, the subscriber side optical modulator and the center side optical modulator modulate the optical carriers and transmit optical transmission signals, and when the supply of optical carriers is stopped, the subscriber side optical modulator and the center side optical modulator themselves generate light, and transmit optical transmission signals.

The optical communication unit according to the second aspect of the present invention, may further comprise: a physical bit rate down-converter that lowers a physical bit rate of transmission signals input from the bi-directional network interface and outputs the transmission signals to the optical receiver; and a transmission-rate controller that controls a physical bit rate to be lowered by the physical bit rate down-converter.

In addition, the optical communication unit may further comprise: a multi-wavelength generation section that outputs optical carriers each having a different wavelength; and an input port into which the optical carriers are input, and wherein the optical transmitter may be provided with an optical modulator and when the optical carriers that are input via the input port from the multi-wavelength generation section is being received, the optical modulator modulates the optical carriers and transmits optical signals, and when the supply of optical carriers is stopped, the optical modulator itself generates light, and transmits optical signals.

As a result, when the present invention is used in a wavelength-division multiplexing access network, it is possible to achieve a wavelength-division multiplexing access network that can provide upstream and downstream physical bit rates that are in the Gigabit class at low cost by using an interface whose upstream and downstream physical bit rates are the same such as a Gigabit Ethernet, which is a widely used bi-directional network interface, and it is also possible to achieve a highly reliable wavelength-division multiplexing access network since communication at a low rate can be provided even if the supply of optical carriers is stopped due to a fault in the light source unit.

In the optical communication system according to the second aspect of the present invention, the center side optical communication unit may be provided with: a tunable multi-wavelength light source that comprises one or a plurality of tunable lasers and that outputs wavelength-tunable optical carriers that each has a different wavelength; and a control unit that decides each of the subscriber side optical communication units to which each of the optical carriers should be supplied, and sets wavelengths corresponding to the decided subscriber side optical communication units as wavelengths of the optical carriers to be output by the tunable multi-wavelength light source, and wherein the subscriber side optical communication unit and the center side optical communication unit may be provided with an input port into which the optical carriers are input, and wherein each of the subscriber side optical transmitters and the center side optical transmitters may be provided respectively with a subscriber side optical modulator and a center side optical modulator, and when the subscriber side optical modulator and the center side optical modulator are each receiving the optical carriers via the input port from the tunable multi-wavelength light source, the subscriber side optical modulator and the center side optical modulator modulate the optical carriers and transmit optical signals, and when the supply of optical carriers is stopped, the subscriber side optical modulator and the center side optical modulator themselves generate light, and transmit optical signals.

The optical communication unit according to the second aspect of the present invention, may further comprise: a tunable multi-wavelength light source that comprises one or a plurality of tunable lasers and that outputs wavelength-tunable optical carriers that each has a different wavelength; a control unit that decides each of the optical communication units to which each of the optical carriers should be supplied, and sets wavelengths corresponding to the decided optical communication units as wavelengths of the optical carriers to be output by the tunable multi-wavelength light source; and an input port into which the optical carriers are input; and wherein the optical transmitter may be provided with an optical modulator and when the optical carriers that are input via the input port from the tunable multi-wavelength light source is being received, the optical modulator modulates the optical carriers and transmits optical signals, and when the supply of optical carriers is stopped, the optical modulator itself generates light, and transmits optical signals.

As a result, when the present invention is used in a wavelength-division multiplexing access network, because it is possible to reduce the number of light sources in the optical communication system as a whole, it is possible to achieve an even lower cost wavelength-division multiplexing access network. In addition, because it is possible to vary the assignment of transmission capacity used by each subscriber in accordance with the amount of subscriber traffic or with the subscriber requirements, a flexible wavelength-division multiplexing access network can be achieved.

DETAILED DESCRIPTION OF THE PREFERRED EMBODIMENTS

[First Embodiment of the Optical Communication System of the Present Invention]

Figure 1:
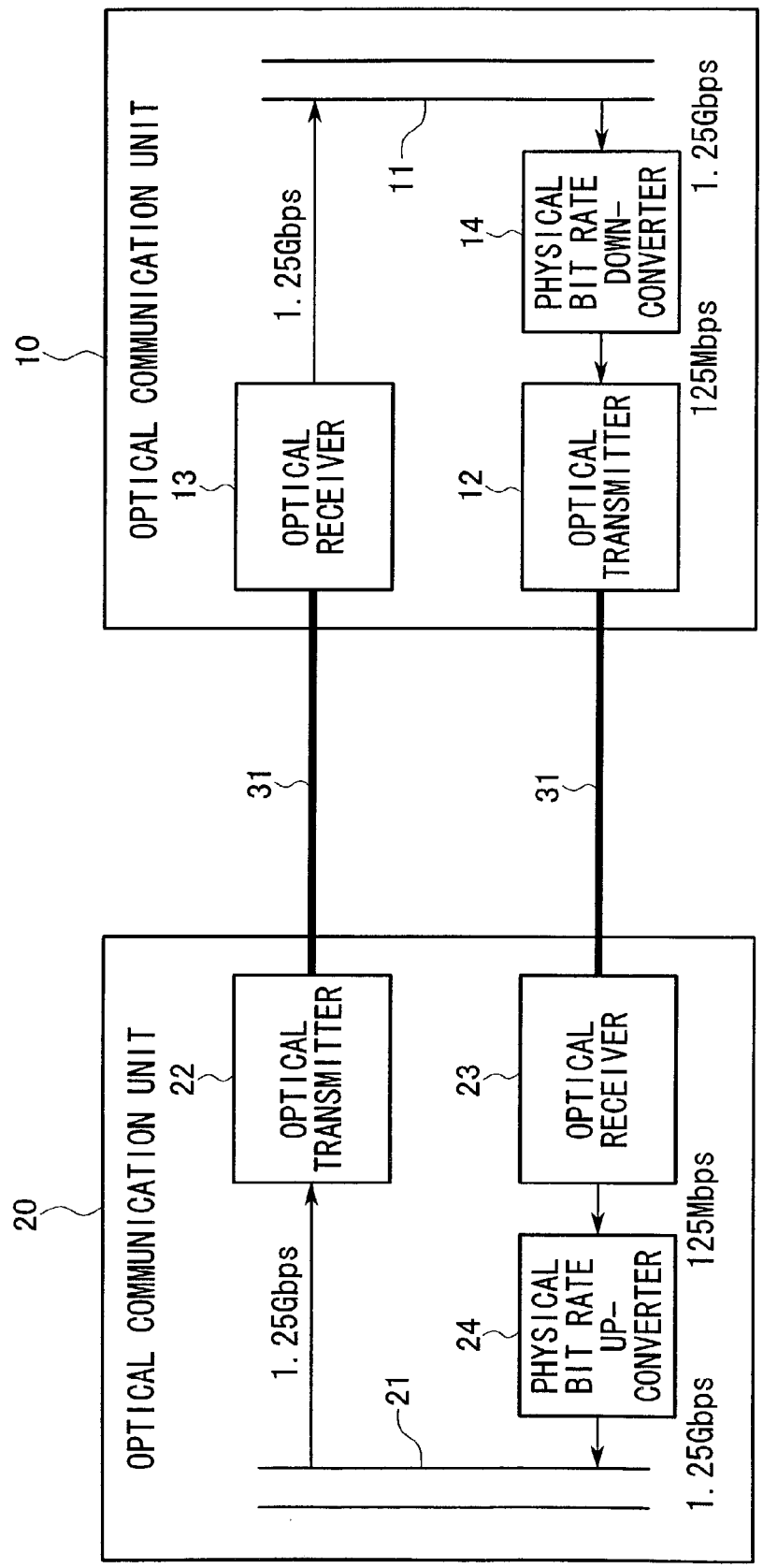
FIG. 1 is a block diagram showing a first embodiment of the optical communication system of the present invention.

FIG. 1 shows a first embodiment of the optical communication system of the present invention. As is shown in FIG. 1, the optical communication system of the present embodiment has a structure in which bi-directional transmissions are performed using a pair of optical communication units 10 and 20 that are connected via two optical fibers 31. The respective optical communication units 10 and 20 are provided with bi-directional network interfaces 11 and 21 that have the same physical bit rate (here, 1.25 Gbps) for both transmission signals and reception signals, optical transmitters 12 and 22, and optical receivers 13 and 23. In the optical communication unit 10 a physical bit rate down-converter 14 that lowers the physical bit rate from 1.25 Gbps to a low physical bit rate (here, 125 Mbps) is provided between the bi-directional network interface 11 and the optical transmitter 12. In the optical communication unit 20 a physical bit rate up-converter 24 that raises the physical bit rate from 125 Mbps to 1.25 Gbps is provided between the optical receiver 23 and the bi-directional network interface 21.

Here, in a transmission from the optical communication unit 10 to the optical communication unit 20, transmission signals input from the bi-directional network interface 11 (having a physical bit rate of 1.25 Gbps) are converted into transmission signals having a physical bit rate of 125 Mbps by the physical bit rate down-converter 14. The transmission signals having a physical bit rate of 125 Mbps are then converted into optical signals and transmitted by the optical transmitter 12. The received optical signals are converted into electrical signals (having a physical bit rate of 125 Mbps) by the optical receiver 23 of the optical communication unit 20, and the signals having a physical bit rate of 125 Mbps are then converted into signals having a physical bit rate of 1.25 Gbps by the physical bit rate up-converter 24 so as to output the signals via the bi-directional network interface 21.

In contrast, in a transmission from the optical communication unit 20 to the optical communication unit 10, transmission signals input from the bi-directional network interface 21 (having a physical bit rate of 1.25 Gbps) are converted into optical signals and are transmitted by the optical transmitter 22. The received optical signals are converted into electrical signals by the optical receiver 13 of the optical communication unit 10 so as to output the reception signals via the bi-directional network interface 11.

In this way, optical signals (having a physical bit rate of 125 Mbps) transmitted from the optical communication unit 10 to the optical communication unit 20 are at a lower physical bit rate compared to optical signals transmitted in the opposite direction (having a physical bit rate of 1.25 Gbps). As a result, even if it is not possible to guarantee that transmission capacity in one direction is the same as the transmission capacity in the other direction due to some reason, bi-directional transmissions are possible between optical communication units.

[Second Embodiment of the Optical Communication System of the Present Invention]

Figure 2:
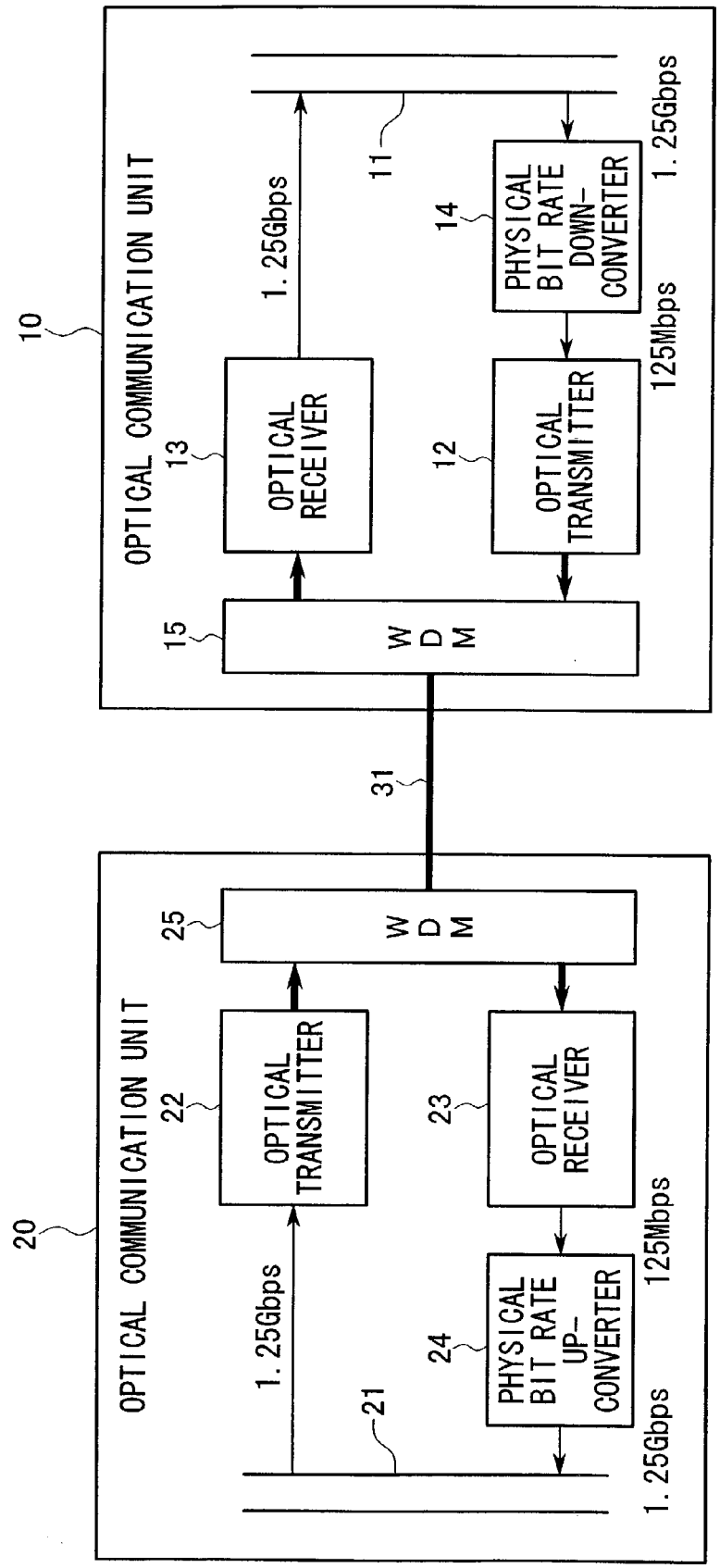
FIG. 2 is a block diagram showing a second embodiment of the optical communication system of the present invention.

In the first embodiment a structure is shown in which bi-directional transmissions are performed using two optical fibers; however, by setting the wavelengths of the optical signals to be different depending on their direction, and providing a wavelength-division multiplexing filter (WDM filter) for performing multiplexing and separation of the optical signals of each wavelength in both of the optical communication units 10 and 20, bi-directional transmissions are possible using a single optical fiber. The relevant structure is shown in FIG. 2. In FIG. 2, the wavelength-division multiplexing filter (WDM filter) 15 of the optical communication unit 10 and the wavelength-division multiplexing filter (WDM filter) 25 of the optical communication unit 20 both have filter characteristics that separate optical signals of each different direction.

[Structural Examples of the Physical Bit Rate Down-converter 14 and the Physical Bit Rate Up-converter 24]

Figure 3A:
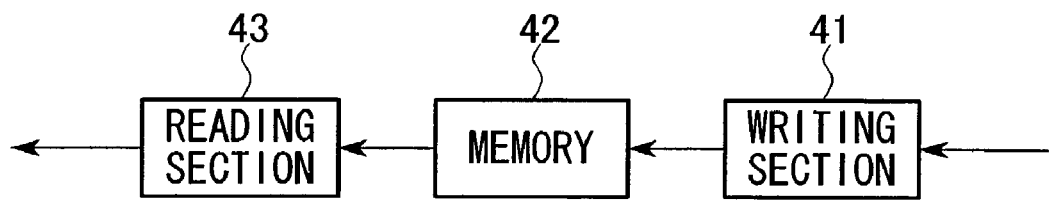
FIG. 3A is a block diagram showing a structural example of a physical bit rate down-converter 14 and a physical bit rate up-converter 24.

The physical bit rate down-converter 14 and the physical bit rate up-converter 24 of the above described first embodiment and second embodiment employ a structure in which, using, for example, a writing section 41, a memory 42, and a reading section 43 such as those shown in FIG. 3A, input signals input by the writing section 41 are written to the memory 42 and temporarily stored in the memory 42, and the input signals stored in the memory 42 are then read at different rates by the reading section 43.

Figure 3B:
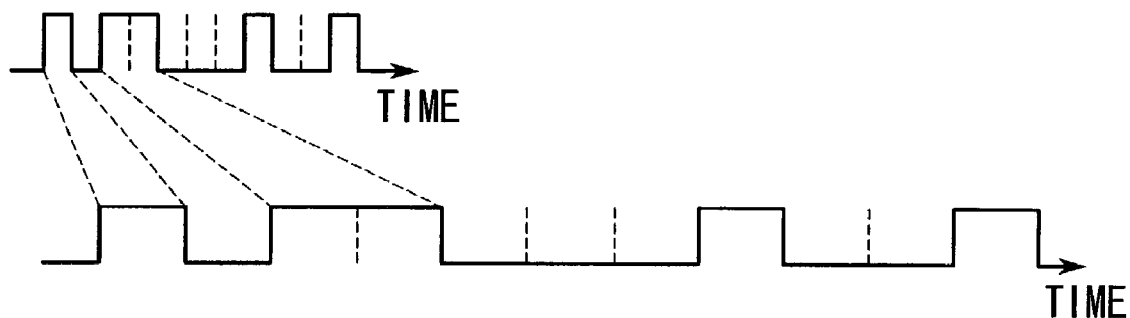
FIG. 3B is a diagram showing an example of the operation of the physical bit rate down-converter 14 when the information being transmitted is seen in bit units.

Here, the operation of the physical bit rate down-converter 14 will be given with reference to FIGS. 3B and 3C. As is shown in FIG. 3B, when the information to be transmitted is seen in bit units, the physical bit rate down-converter 14 outputs the data stream whose bit duration is expanded at the same magnification of each of the input continuous bit sequences. However, because it is not possible to output all of the input information in this state, the memory 42 is provided as a buffer, and the memory 42 is normally filled with information as far as the capacity of the memory 42 will allow.

Figure 3C:
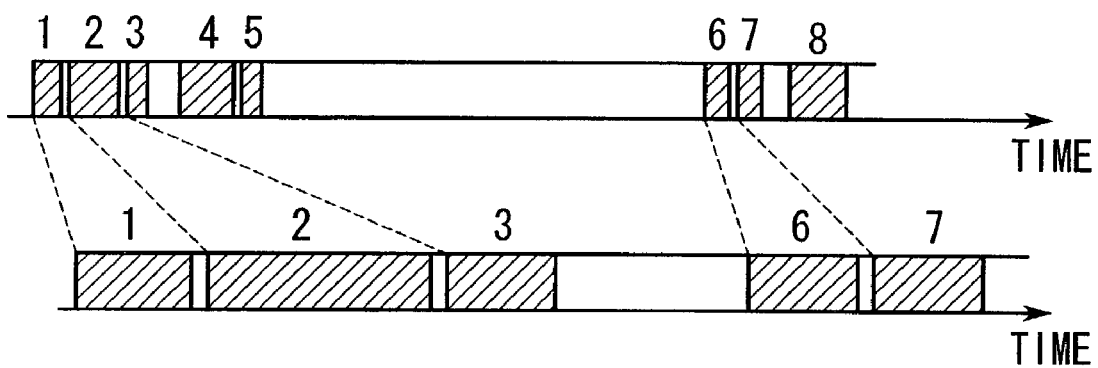
FIG. 3C is a diagram showing an example of the operation of the physical bit rate down-converter 14 when the information being transmitted is seen in packet units.

FIG. 3C shows an example of the operation when the information being transmitted is seen in packets. The physical bit rate down-converter 14 outputs the packet buffered in the memory 42 whose length is expanded in proportion to the respective bit duration being given the same magnification. If the memory 42 becomes filled up, then packets are discarded of, such as the data packets 4 and 5 in FIG. 3C. However, when the widely used Transmission Control Protocol/Internet Protocol (TCP/IP) is used as the host protocol, because the throughput of the transmitted data is controlled such that packet loss does not occur in the TCP layer, there is no problem for communication even if this type of structure is employed.

The physical bit rate up-converter 24 performs the opposite operation to that described above. Because the output rate is faster than the input rate, there is no packet loss provided that the memory is capable of storing one of the maximum packet length.

[Third Embodiment of the Optical Communication System of the Present Invention]

Figure 4:
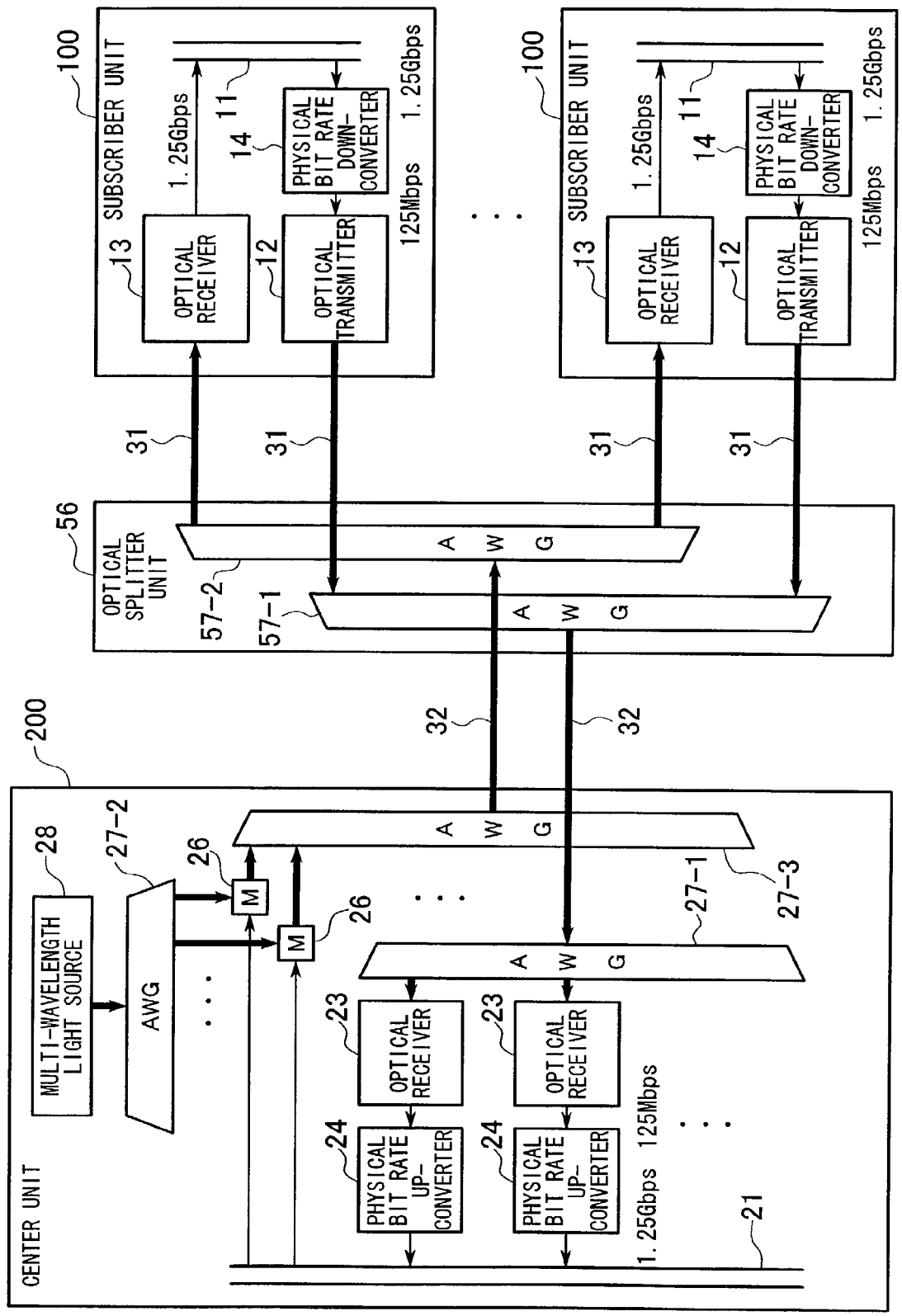
FIG. 4 is a block diagram showing a third embodiment of the optical communication system of the present invention.

FIG. 4 shows the third embodiment of the optical communication system of the present invention. Here, a structural example is shown in which, in a wavelength-division multiplexing access network in which a plurality of subscriber units 100 are connected to a center unit 200 via an optical splitter unit 56, a spectrum-slicing scheme is used for upstream transmissions from each subscriber unit 100 to the center unit 200. Moreover, a multi-wavelength light source is used to generate downstream signals from the center unit 200 to the subscriber units 100.

In FIG. 4, the plurality of subscriber units 100 and the center unit 200 are connected via optical fibers 31, an optical splitter unit 56, and optical fibers 32. Each subscriber unit 100 is provided with a bi-directional network interface 11 that has the same physical bit rate (here, 1.25 Gbps) for both transmission signals and reception signals, an optical transmitter 12, and an optical receiver 13. A physical bit rate down-converter 14 that lowers the physical bit rate from 1.25 Gbps to 125 Mbps is also provided between the bi-directional network interface 11 and the optical transmitter 12. The optical transmitter 12 outputs modulated broadband light obtained by modulating spontaneous emissions using transmission signals whose physical bit rate has been lowered to 125 Mbps by the physical bit rate down-converter 14.

The center unit 200 is provided with a bi-directional network interface 21 that has the same physical bit rate (here, 1.25 Gbps) for both transmission signals and reception signals, optical receivers 23, optical modulators (M) 26, arrayed waveguide grating filters (AWG) 27-1, 27-2, and 27-3, and a multi-wavelength light source 28. Physical bit rate up-converters 24 that raise the physical bit rate from 125 Mbps to 1.25 Gbps are also provided between the optical receiver 23 and the bi-directional network interface 21. The arrayed waveguide grating filter 27-1 receives the input of upstream wavelength-division multiplexed optical signals obtained by wavelength-division multiplexing modulated broadband light transmitted from each subscriber unit 100 that has first been spectrum-sliced by the optical splitter unit 56, and demultiplexes these wavelength-division multiplexed optical signals to the optical receiver 23 that corresponds to the respective subscriber unit 100. The arrayed waveguide grating filter 27-2 demultiplexes multi-wavelength light output from the multi-wavelength light source 28 into continuous waves of the respective wavelengths, and supplies them to the optical modulators 26 corresponding to the respective subscriber units 100. The arrayed waveguide grating filter 27-3 multiplexes optical signals that are addressed to respective subscriber units 100 and are modulated by the optical modulators 26, and sends them to the optical splitter unit 56 as downstream wavelength-division multiplexed optical signals.

The optical splitter unit 56 is provided with arrayed waveguide grating filters (AWG) 57-1 and 57-2. The arrayed waveguide grating filter 57-1 spectrally slices modulated broadband light transmitted from each subscriber unit 100 using the wavelength allocated to each subscriber unit 100, and performs wavelength-division multiplexing on the spectrum-sliced light of each subscriber unit. The resulting light is then transmitted to the center unit 200 as upstream wavelength-division multiplexed optical signals. The arrayed waveguide grating filter 57-2 demultiplexes downstream wavelength-division multiplexed optical signals from the center unit 200 for each wavelength, and transmits the result to the respective subscriber unit 100.

Here, in a transmission from a subscriber unit 100 to the center unit 200, transmission signals (physical bit rate 1.25 Gbps) input from the bi-directional network interface 11 are converted into transmission signals having a physical bit rate of 125 Mbps by the physical bit rate down-converter 14, and are then converted into optical signals and transmitted by the optical transmitter 12. For example, in a subscriber unit 100, transmission signals (having a physical bit rate of 1.25 Gbps) from a Gigabit Ethernet interface are converted into signals having a physical bit rate of 125 Mbps (which is the physical bit rate for Fast Ethernet) by the physical bit rate down-converter 14. The converted signals are then transmitted from the optical transmitter 12 as upstream optical signals (modulated broadband light) having a physical bit rate 125 Mbps. In the center unit 200 optical signals received by the optical receiver 23 are converted into electrical signals (having a physical bit rate of 125 Mbps), and are then converted into signals having a physical bit rate of 1.25 Gbps by the physical bit rate up-converter 24 to output reception signals via the bi-directional network interface (Gigabit Ethernet interface) 21.

In contrast, in a transmission from the center unit 200 to the subscriber unit 100, transmission signals input from the bi-directional network interface 21 (having a physical bit rate of 1.25 Gbps) are input into the optical modulators 26, and the light of each wavelength (optical carrier) output from the multi-wavelength light source 28 and demultiplexed by the arrayed waveguide grating filter 27-2 is then modulated and transmitted. The received optical signals are converted into electrical signals by the optical receiver 13 of the subscriber unit 100 so as to output reception signals via the bi-directional network interface 11.

In this way, upstream optical signals (having a physical bit rate of 125 Mbps) transmitted from the subscriber unit 100 to the center unit 200 are at a lower physical bit rate compared to downstream optical signals transmitted in the opposite direction (having a physical bit rate of 1.25 Gbps). As a result, it is possible to transmit the spectrum-sliced light obtained by modulated broadband light as upstream optical signals.

Note that in the subscriber unit 100 of the present embodiment it is assumed that the bi-directional network interface 11 is an electrical signal connection; however, it is also possible to use an optical interface. In this case, a separate O/E converter may be provided, or a structure may be employed in which the downstream optical signals are input directly to the bi-directional network interface without going through the optical receiver 13.

Figure 5:
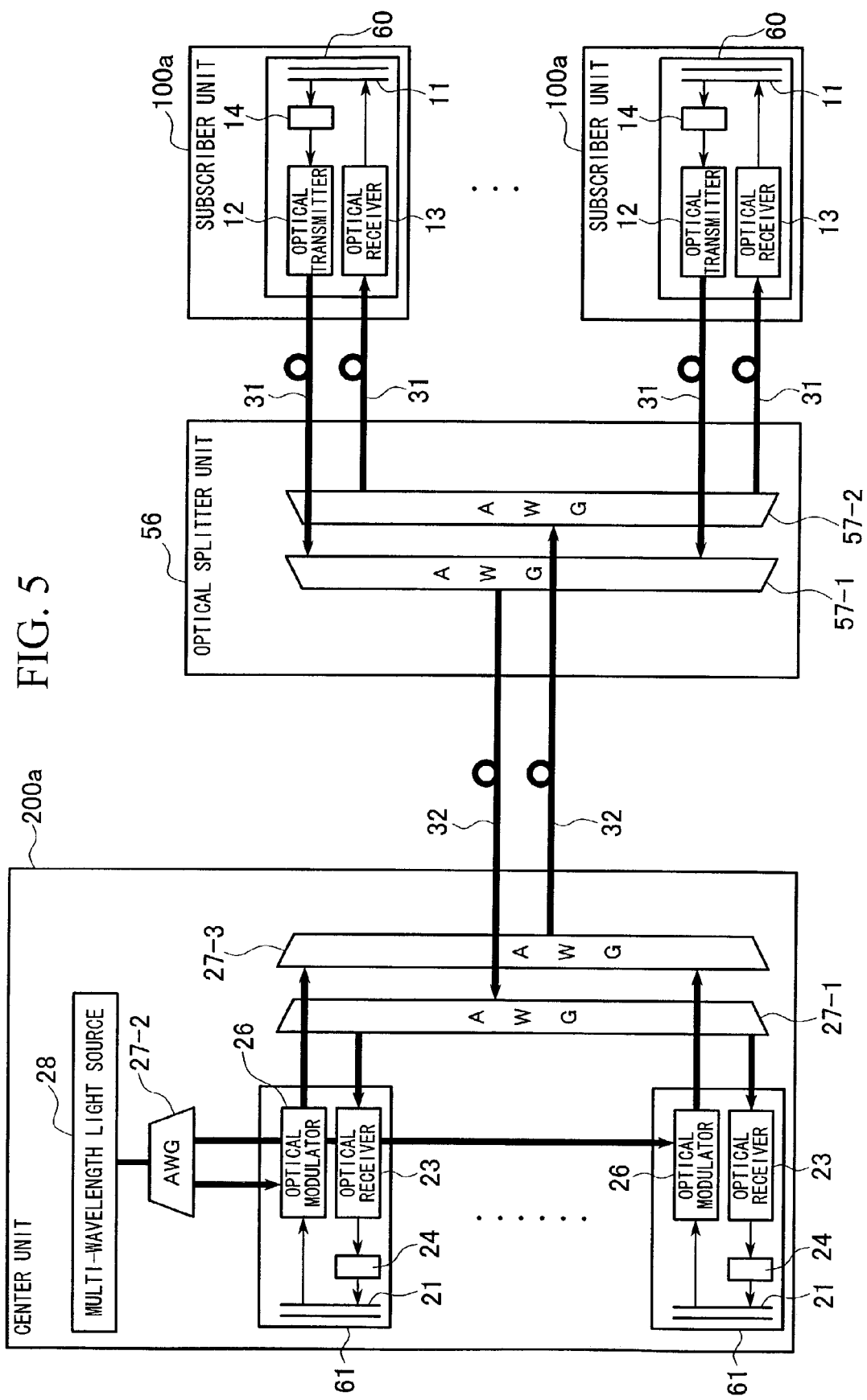
FIG. 5 is a block diagram showing a structural example when an optical transceiving package is employed in the third embodiment of the optical communication system of the present invention.

Here, for example, if the center unit 200 is formed by a HiPAS bay, each structural element such as the optical transceiver and AWGs are formed into a package and housed in an unit (or HiPAS bay). In the subscriber unit 100, in order to reduce the size of the housing, each structural element may be integrated on a board and packaged. Therefore, the set of the bi-directional network interface 21, the optical receiver 23, the physical bit rate up-converter 24, and the optical modulator 26 in the center unit 200; or the set of the bi-directional network interface 11, the optical transmitter 12, the optical receiver 13, and the physical bit rate down-converter 14 in the subscriber unit 100 are handled respectively as a single package or board, and by referring to each one as the optical transceiving package 61 and the optical transceiving package 60, it is possible for FIG. 4 to be depicted in the same manner as is shown in FIG. 5. Note that the integrated structure formed by structural elements is not limited to the above-described package or board, and all equivalent structures are included in the description (for example, including cards or modules). It is also possible to refer to the structure as a transceiver in view of its function.

[Fourth Embodiment of the Optical Communication System of the Present Invention]

Figure 6:
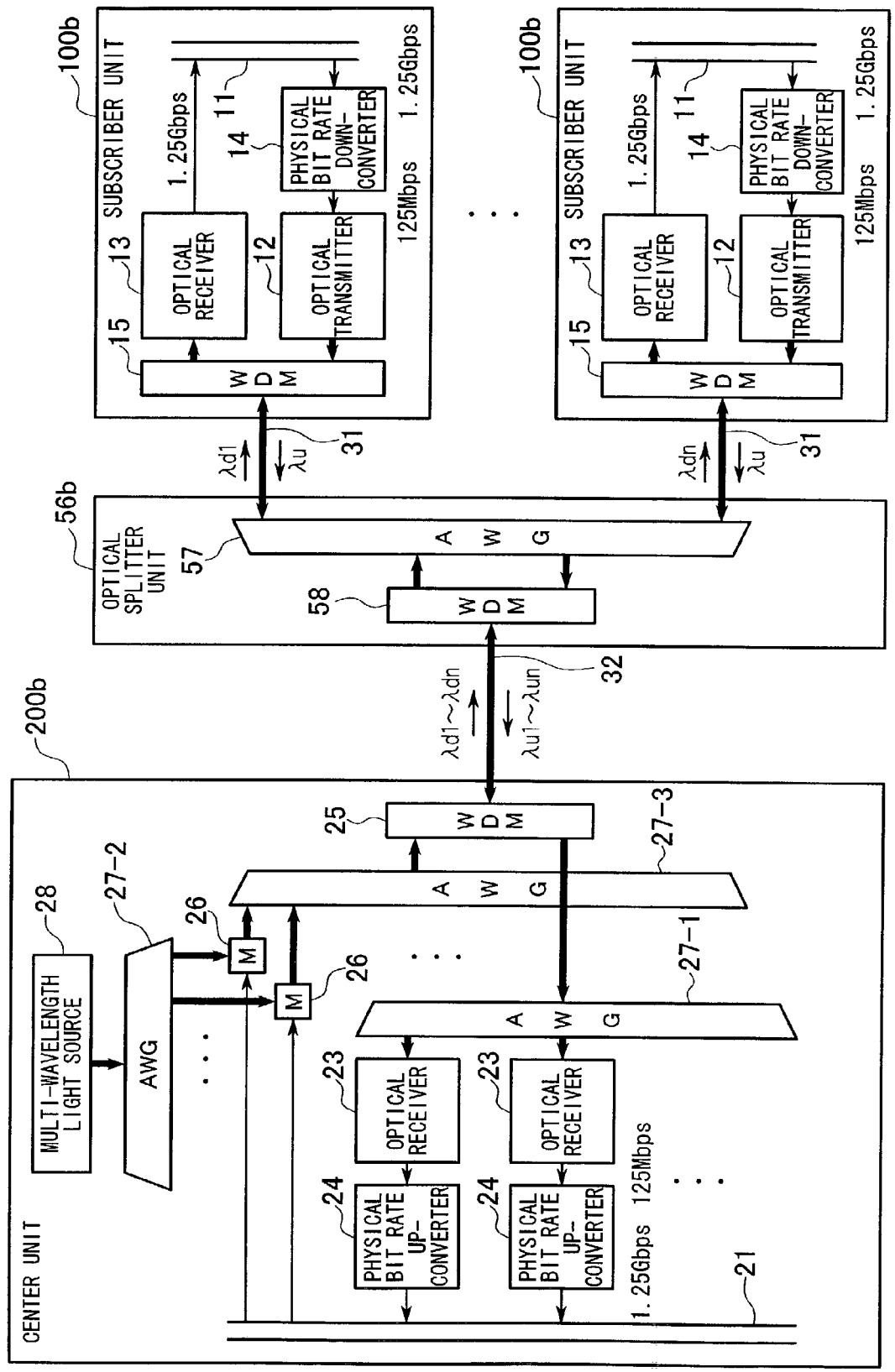
FIG. 6 is a block diagram showing a fourth embodiment of the optical communication system of the present invention.

In the third embodiment, a structure is shown in which bi-directional transmissions are made by providing optical fibers in both the upstream and downstream directions; however, by setting the wavelengths of the optical signals to be different depending on their direction, and using a wavelength-division multiplexing filter (WDM filter) for performing multiplexing and separation of the optical signals of each wavelength, bi-directional transmissions are possible using a single optical fiber. A structural example of this is shown in FIG. 6. Here, the wavelength band used for the upstream optical signals and the downstream optical signals is divided into two, and the long wavelength band is used for downstream optical signals while the short wavelength band is used for upstream optical signals.

Figure 8A:
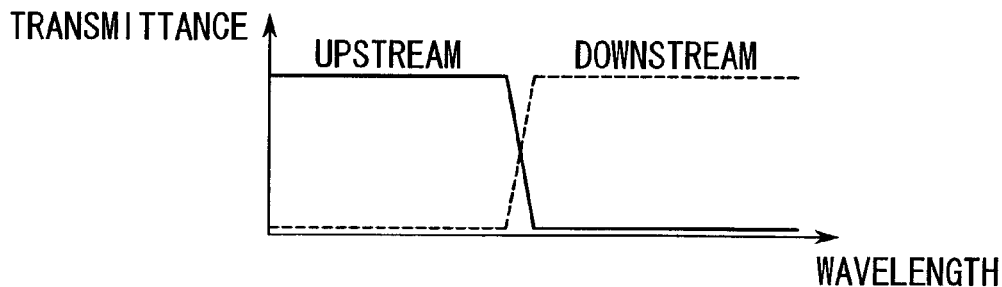
FIGS. 8A and 8B are diagrams showing filter characteristics of a wavelength-division multiplexing filter (WDM filter) 15 in the fourth embodiment of the optical communication system of the present invention.
Figure 8B:
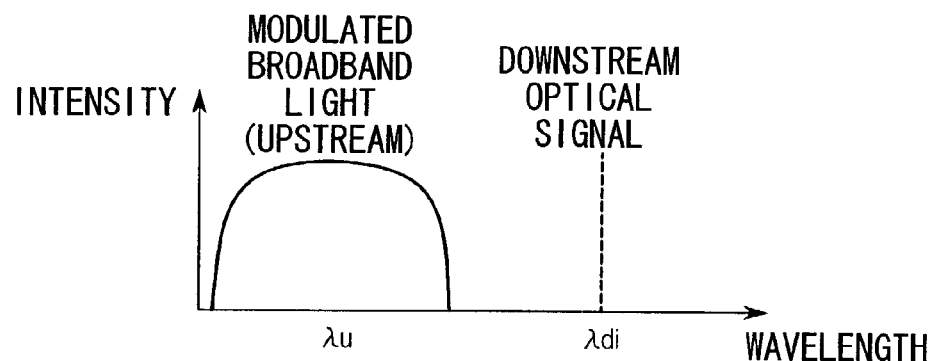

In FIG. 6, a wavelength-division multiplexing filter (WDM filter) 15 provided in the subscriber unit 100b has filter characteristics (shown in FIG. 8A) that separate modulated broadband light transmitted as upstream optical signals from downstream optical signals of the wavelengths allocated to each subscriber unit 100, as is shown in FIG. 8B. Modulated broadband light ($\lambda$u) transmitted from the optical transmitter 12 is sent to an optical fiber 31 via the wavelength-division multiplexing filter 15, while downstream optical signals from an optical fiber 31 ($\lambda$di (i=1 to n)) are received in the optical receiver 13 via the wavelength-division multiplexing filter 15.

Figure 8C:
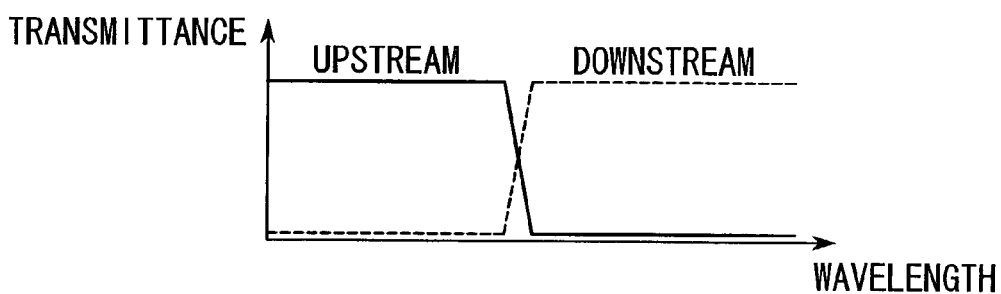
FIGS. 8C and 8D are diagrams showing filter characteristics of wavelength-division multiplexing filters (WDM filters) 25 and 58 in the fourth embodiment of the optical communication system of the present invention.
Figure 8D:
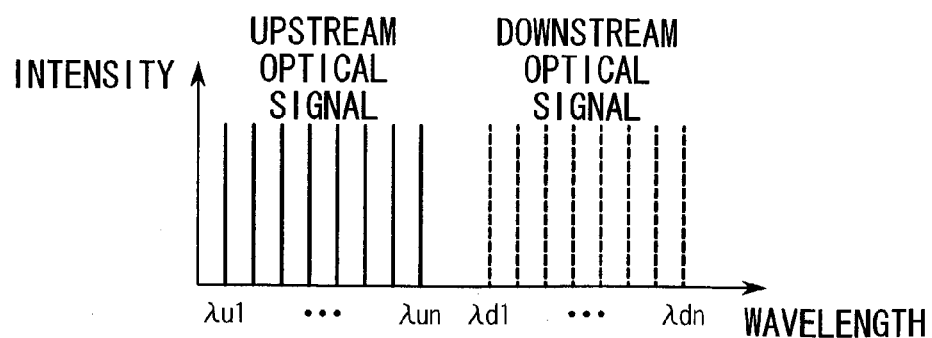

The wavelength-division multiplexing filter (WDM filter) 58 provided in the optical splitter unit 56b and the wavelength-division multiplexing filter (WDM filter) 25 provided in the center unit 200b have filter characteristics (shown in FIGS. 8C) that multiplex and separate wavelength-division multiplexed optical signals on the short wavelength band ($\lambda$u1 to $\lambda$un) transmitted as upstream optical signals and wavelength-division multiplexed optical signals on the long wavelength band ($\lambda$d1 to $\lambda$dn) transmitted as downstream optical signals, as is shown in FIG. 8D. Upstream wavelength-division multiplexed optical signals from the optical splitter unit 56b to the center unit 200b are transmitted via the wavelength-division multiplexing filter 58 and the optical fiber 32, and are separated from downstream wavelength-division multiplexed optical signals by the wavelength-division multiplexing filter 25. Downstream wavelength-division multiplexed optical signals from the center unit 200b to the optical splitter unit 56b are transmitted via the wavelength-division multiplexing filter 25 and the optical fiber 32, and are separated from upstream wavelength-division multiplexed optical signals by the wavelength-division multiplexing filter 58.

Figure 7A:
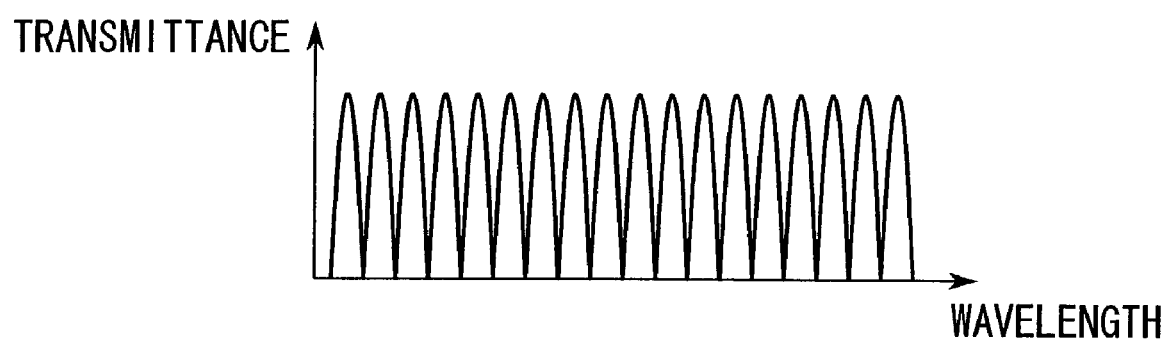
FIGS. 7A and 7B are diagrams showing filter characteristics of an arrayed waveguide grating filter (AWG) in the fourth embodiment of the optical communication system of the present invention.
Figure 7B:
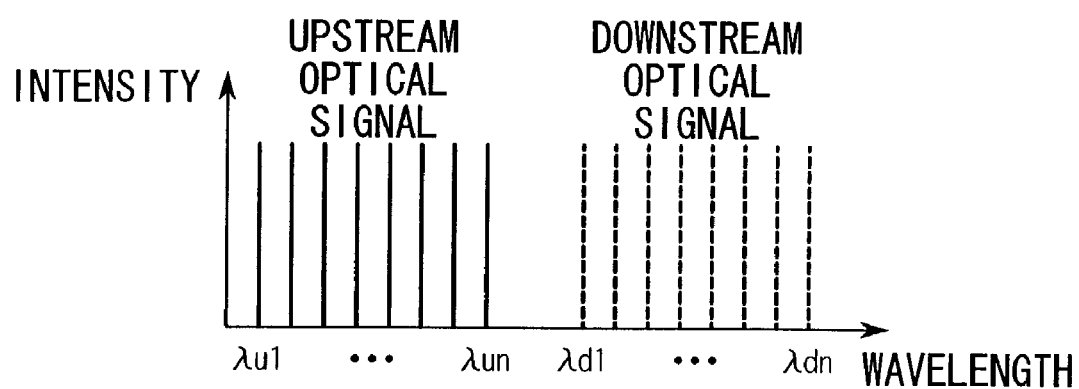

In the optical splitter unit 56 of the third embodiment, a structure is employed in which the upstream signals and downstream signals are multiplexed or demultiplexed by separate arrayed waveguide grating filters 57-1 and 57-2; however, in the present embodiment the upstream signals and downstream signals can be dealt with using a single arrayed waveguide grating filter 57 that is combined with the wavelength-division multiplexing filter (WDM filter) 58. The filter characteristics of the arrayed waveguide grating filter 57 in the upstream and downstream directions are shown in FIGS. 7A and 7B, respectively.

Note that in the center units of the third and fourth embodiments a structure is employed in which the upstream signals and downstream signals are multiplexed or demultiplexed by separate arrayed waveguide grating filters; however, the upstream signals and downstream signals can also be dealt with using a single arrayed waveguide grating filter that is combined with the wavelength-division multiplexing filter (WDM filter).

Figure 9:
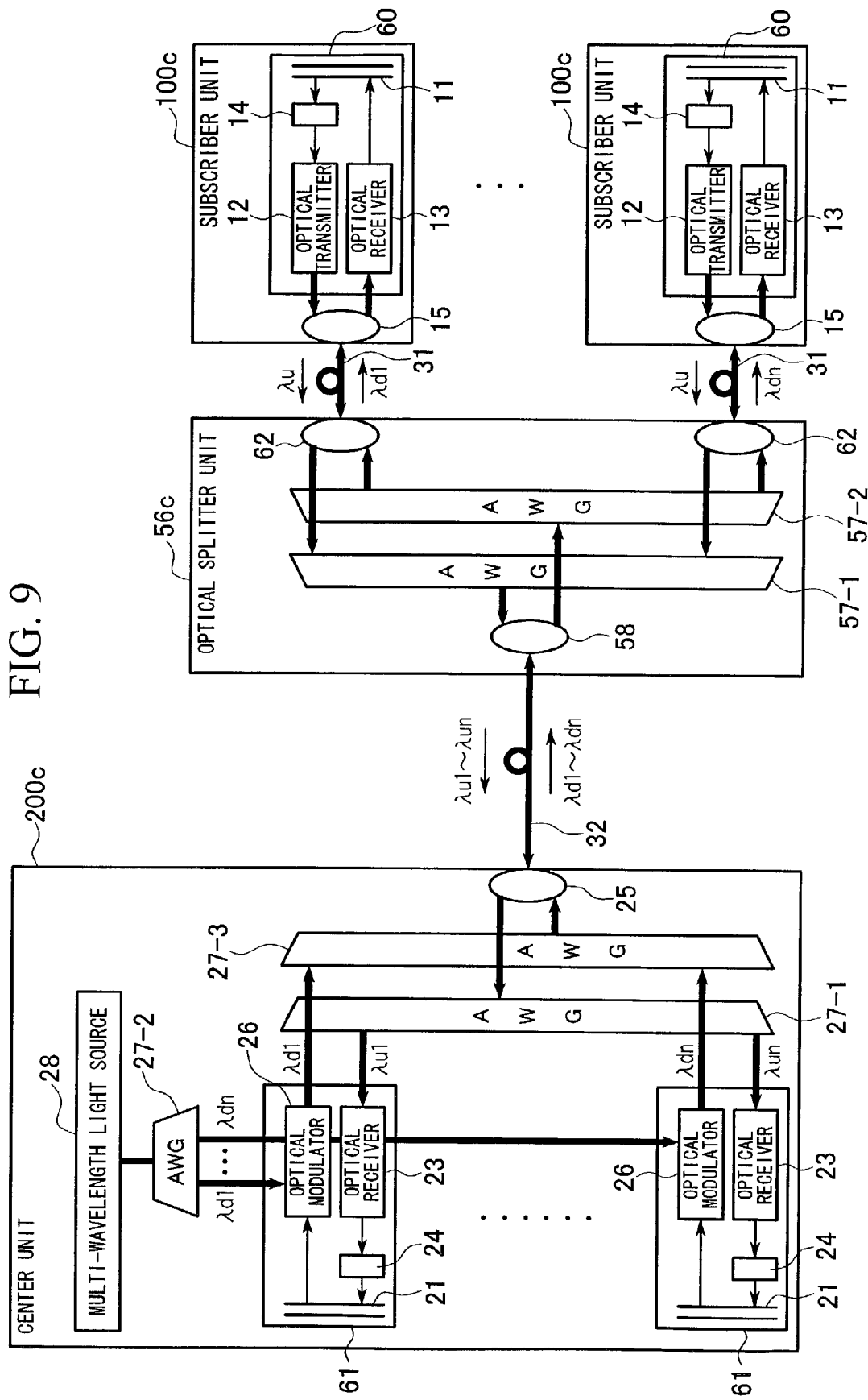
FIG. 9 is a block diagram showing a structural example when an optical transceiving package is employed in the fourth embodiment of the optical communication system of the present invention.

It is also possible for FIG. 6 to be depicted in the same manner as is shown in FIG. 9 by handling the set of the optical modulators 26, the optical transmitters 12, the optical receivers 23 and 13, the bi-directional network interfaces 21 and 11, and the physical bit rate up-converter 24 and physical bit rate down-converter 14 respectively provided in the center unit 200b and the subscriber unit 100b as single optical transceiving packages. Here, in FIG. 9, because a structure is employed in which the upstream signals and downstream signals are multiplexed or demultiplexed by separate arrayed waveguide grating filters 57-1 and 57-2, n number of wavelength-division multiplexing filters (WDM filters) 62 having filter characteristics that separate optical signals of different directions are provided between the arrayed waveguide grating filters 57-1 and 57-2 and the respective subscriber units 100c.

[Fifth Embodiment of the Optical Communication System of the Present Invention]

Figure 10:
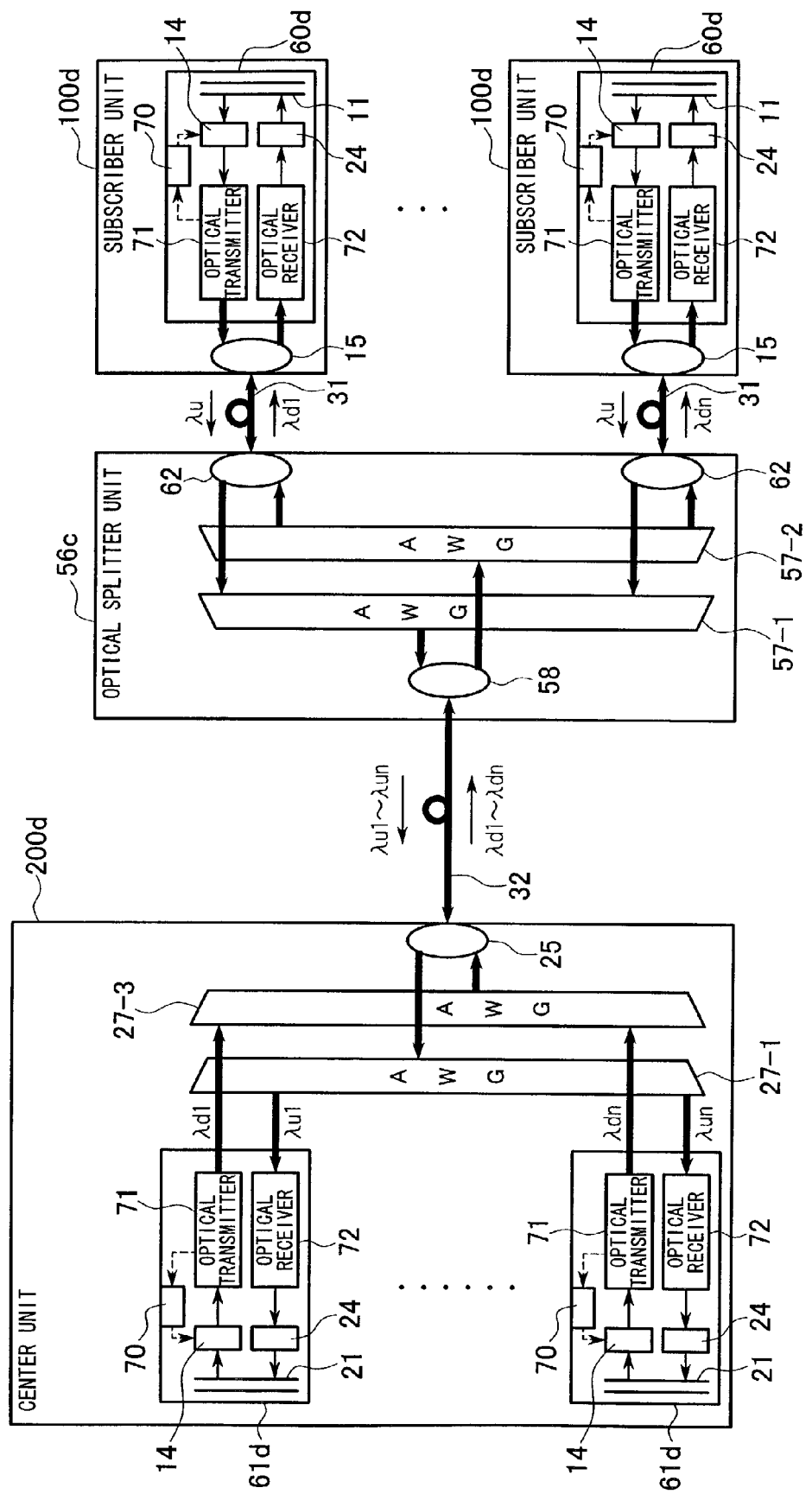
FIG. 10 is a block diagram showing a fifth embodiment of the optical communication system of the present invention.

FIG. 10 shows the fifth embodiment of the optical communication system of the present invention.

In FIG. 10, the optical communication system of the present embodiment employs a structure in which bi-directional transmissions are performed with a single center unit 200d and a plurality of subscriber units 100d connected via the optical splitter unit 56c by the single optical fibers 31 and 32. Note that the basic structure of the network for transmitting the downstream optical signals and the upstream optical signals is the same as that shown in FIG. 9 used to describe the fourth embodiment. However, in the present embodiment, in addition to the physical bit rate up-converter 24 of the center unit 200c and the physical bit rate down-converter 14 of the subscriber unit 100c shown in FIG. 9, a physical bit rate down-converter 14 and a transmission-rate controller 70 are provided in the center unit 200d, and the physical bit rate up-converter 24 and the transmission-rate controller 70 are provided in the subscriber unit 100d. In addition, a semiconductor optical amplifier is provided as an optical modulator in the optical transmitters 71 in both the center unit 200d and the subscriber unit 100d.

The flow of signals in each optical communication unit (the center unit 200d or the subscriber unit 100d) is described below. Signals (having a physical bit rate of 1.25 Gbps) taken into the respective optical communication units via the bi-directional network interface 11 or 21 are either down-converted in transmission rate to 125 Mbps by the physical bit rate down-converter 14 and sent to the optical transmitter 71 or are sent to the optical transmitter 71 by the physical bit rate down-converter 14 as they are at a transmission rate of 1.25 Gbps. These signals are then converted into optical signals by the optical transmitter 71 and transmitted to the other optical communication unit. At this time, the transmission rate of the signals sent to the optical transmitter 71 is determined by the transmission-rate controller 70 based on the physical quantity monitored by the optical transmitter 71. Note that the term "physical quantity" used here refers, for example, to the power of the optical carrier in the optical transmitter 71.

The optical signals input into the respective optical communication unit are received as electrical signals by a wideband optical receiver 72 that can receive a wide range of bit rate signals. The physical bit rate at this time is either 1.25 Gbps or 125 Mbps, and the signals are converted into 1.25-Gbps signals by the physical bit rate up-converter 24 to become output signals via the bi-directional network interface 11 or 21.

In this way, optical signals transmitted between optical communication units are able to be transmitted at either a high (1.25 Gbps) or low (125 Mbps) physical bit rate by using the physical bit rate down-converter 14 or the physical bit rate up-converter 24. As a result, even if a high rate optical signal transmission cannot be secured due to some reason, bi-directional transmissions between optical communication units at a low rate is still possible.

Here, a structure is shown in which bi-directional transmissions are performed using a single optical fiber; however, it is also possible to separate the upstream optical signals from the downstream optical signals, and perform bi-directional transmissions using two optical fibers.

Figure 11:
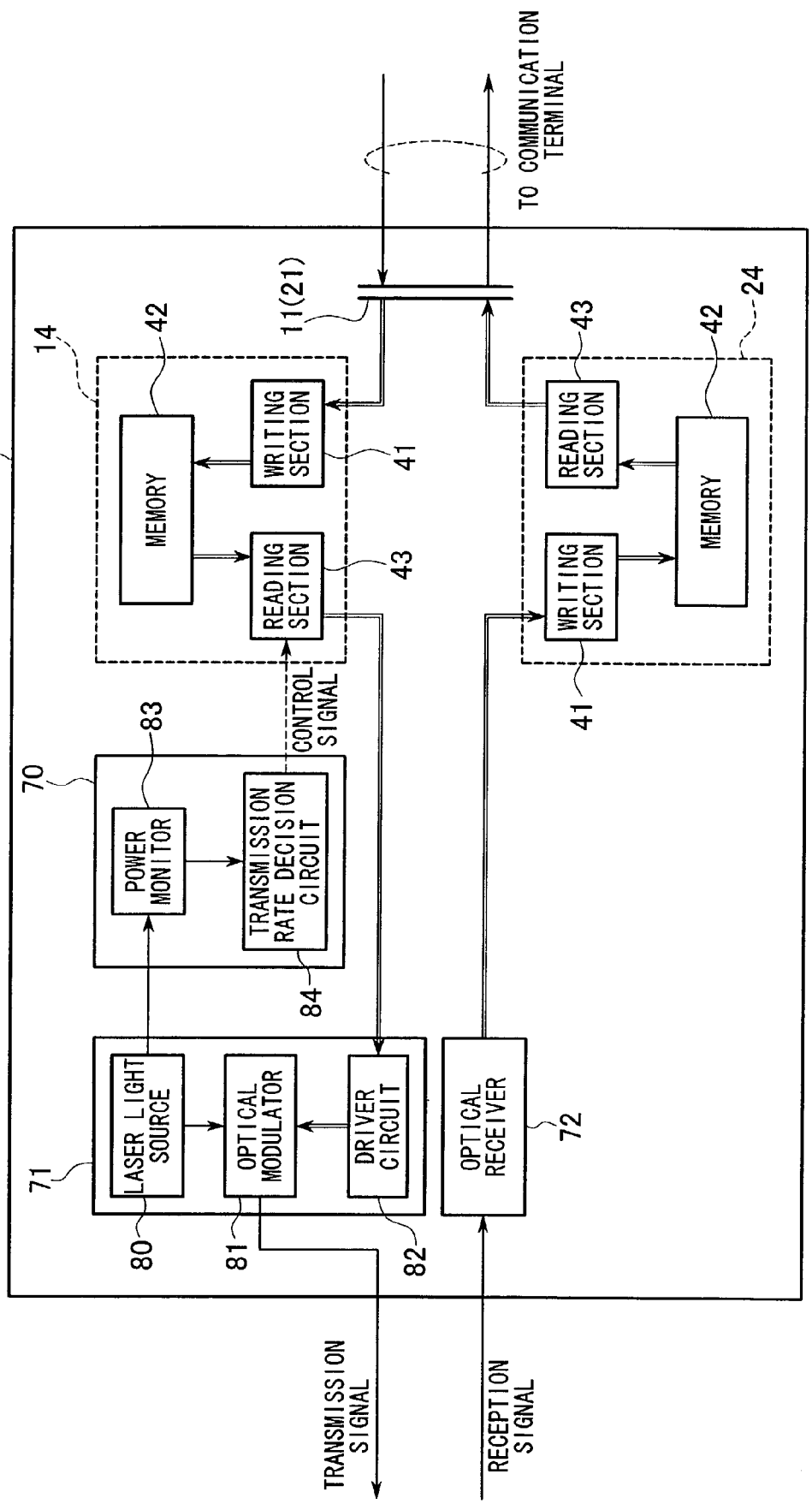
FIG. 11 is a block diagram showing a structural example of an optical transceiving package in the fifth embodiment.

The optical transceiving packages 60d and 61d provided in the center unit 200d and the subscriber units 100d shown in FIG. 10 may be given the same structures, and they may be realized by, for example, the structure shown in FIG. 11.

The optical transmitter 71 is formed by a laser light source 80, an optical modulator 81 capable of generating light itself, and a drive circuit 82 for driving the optical modulator 81. A semiconductor optical amplifier, for example, may be used to achieve an optical modulator capable of generating light itself. The transmission-rate controller 70 is formed by a power monitor 83 that measures output power from the laser light source 80 inside the optical transmitter 71, and a transmission rate decision circuit 84 that decides the transmission rate by receiving the output power measurement signals from the power monitor 83. The physical bit rate down-converter 14 and the physical bit rate up-converter 24 have the same structures respectively as those described for the first embodiment (shown in FIG. 3A).

Note that in FIG. 11 the laser light source 80 is incorporated inside the optical transceiving package 60d (61d); however, the laser light source 80 may also be provided outside the optical transceiving package.

[Operating Characteristics when a Semiconductor Optical Amplifier is Used as the optical Modulator]

Here, how a semiconductor optical amplifier functions when it is used as the optical modulator is described. When a semiconductor optical amplifier is used as the optical modulator, functions that differ from those of other optical modulators can be obtained. This is because, as a semiconductor optical amplifier is the optical amplifier: 1) there is an amplifying action, and 2) noise is generated from spontaneous emission. Due to reasons such as these, when the optical power input into the semiconductor optical amplifier is sufficiently large the effects of noise caused by spontaneous emission on the transmission characteristics of the signals is small. However, as the optical power input becomes smaller, the signal-to-noise ratio (SNR) deteriorates due to this noise. The details of this characteristic are described quantitatively using FIGS. 12A and 12B. Note that when a semiconductor optical amplifier is used as the modulator, it is referred to below as an SOA modulator.

Figures 12A, 12B:
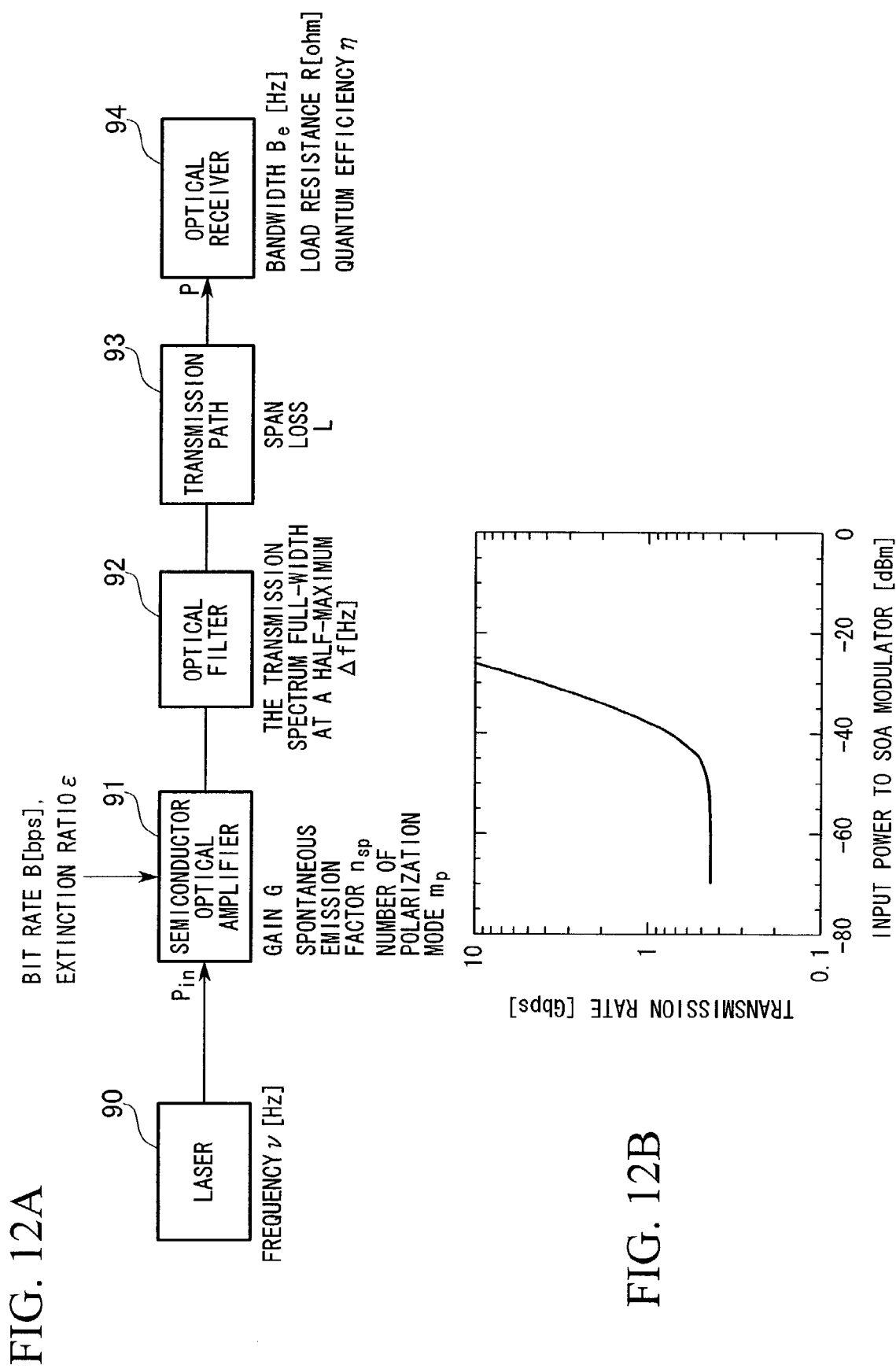
FIG. 12A is a block diagram showing a simulated model of a transmission system when a semiconductor optical amplifier is used as a modulator.
FIG. 12B is a diagram showing a relationship between optical power input into the semiconductor optical amplifier and the maximum transmittable bit rate.

A simulated model for a transmission system using an SOA modulator can be assumed that is formed by a laser 90, a semiconductor optical amplifier (SOA modulator) 91, an optical filter 92, a transmission path 93, and an optical receiver 94, such as is shown in FIG. 12A. The gain of the SOA modulator 91 is taken as G, the spontaneous emission factor as $n_{sp}$, and the number of polarization mode as $m_p$. The number of polarization mode is the total number of waveguided transverse modes, and in a polarization sensitive type of SOA modulator such as one that amplifies only the TE polarization component, $m_p=1$, while in a polarization-insensitive SOA modulator, $m_p=2$. In this case, it will be taken that the SOA modulator 91 is being driven at a bit rate of B [bps], and an extinction ratio of ε. Here, it will be assumed that a continuous wave having a single optical frequency ν [Hz] and an optical power of $P_n$ [W] is being irradiated from the laser 90 into the SOA modulator 91 as an optical carrier. At this time, when the codes are a mark and a space, the average number of photons $<n_{out}>$ output from the SOA modulator 91 can be expressed respectively by:

$$<n_{out}>_m = G\frac{P_{in}}{hv} + (G-1)n_{sp}m_p \quad (1\text{-a})$$

$$<n_{out}>_s = \varepsilon\left[G\frac{P_{in}}{hv} + (G-1)n_{sp}m_p\right] = \varepsilon<n_{out}>_m \quad (1\text{-b})$$

where h is Planck's constant. Here, the first term on the right side of Formulas (1-a) and (1-b) represents amplified signal light, while the second term represents spontaneous emissions generated by the SOA modulator. Because the phases of spontaneous emissions are random, interference occurs between the signal light and the spontaneous emissions, or else interference occurs between the spontaneous emissions themselves, and such interference generates beat noise. Generally, in order to suppress the effects of beat noise, the spontaneous emissions may be reduced using the optical filter 92 before they are input into the optical receiver 94. If the electrical bandwidth of the optical receiver 94 is taken as $B_e$ [Hz], the transmission spectrum full-width at a half-maximum of the optical filter 92 is taken as Δf [Hz], and the span loss of the transmission path 93 is taken as L, then when the codes are a mark and a space the average number of photons $<n_{orn}>$ input into the optical receiver 94 can be expressed respectively by:

$$<n_{orin}>_m = L\left[G\frac{P_{in}}{hv} + (G-1)n_{sp}m_p\Delta f\right] \quad (2\text{-a})$$

$$<n_{orin}>_s = \varepsilon L\left[G\frac{P_{in}}{hv} + (G-1)n_{sp}m_p\Delta f\right] = \varepsilon<n_{orin}>_m \quad (2\text{-b})$$

When signal light expressed by Formulas (2-a) and (2-b) is input into the optical receiver 94, which has a quantum efficiency of η, the direct current components $I_m$ and $I_s$ of the photo current for a mark and space may be expressed by:

$$I_m = e\eta L\left[G\frac{P_{in}}{hv} + (G-1)n_{sp}m_p\Delta f\right] \quad (3\text{-a})$$

-continued $$I_s = e\eta \varepsilon L\left[G\frac{P_{in}}{h\nu} + (G-1)n_{sp}m_p\Delta f\right] = \varepsilon I_m \quad (3\text{-b})$$

Here, e represents the electronic charge. Moreover, the intensity of the received photo current fluctuates depending on various types of noise. In the model in FIG. 12A, various types of noise component can be considered, including: (I) shot noise, (II) thermal noise from the optical receiver 94, (III) beat noise generated by interference between spontaneous emissions emitted by the SOA modulator 91 and the modulated signals, and (IV) beat noise generated by interference between spontaneous emissions. The power of these noises are represented by variance of the intensity in the received photo current $\sigma_m^2$ and $\sigma_s^2$ for a mark and a space may be expressed by:

$$\sigma_m^2 = \quad (4\text{-a})$$
$$\left[2eI_m + \frac{4kT}{R} + 2e^2\eta^2 L\left\{2G\frac{P_{in}}{h\nu}(G-1)n_{sp} + (G-1)^2 n_{sp}^2 m_p\Delta f\right\}\right]B_e$$

$$\sigma_s^2 = \quad (4\text{-b})$$
$$\left[2eI_s + \frac{4kT}{R} + 2e^2\eta^2 \varepsilon L\left\{2G\frac{P_{in}}{h\nu}(G-1)n_{sp} + (G-1)^2 n_{sp}^2 m_p\Delta f\right\}\right]B_e$$

Note that $B_e$ [Hz] is the bandwidth of the optical receiver 94, R [ohm] is the load resistance of the optical receiver 94, k is Boltzmann's constant, and T is the absolute temperature. The first term on the right side in Formulas (4-a) and (4-b) represents shot noise, the second term represents thermal noise, the third term represents beat noise generated by interference between spontaneous emissions and the modulated signals, and the fourth term represents beat noise generated by interference between spontaneous emissions.

The signal-to-noise ratio SNR of the received signals at the optical receiver 94 is derived using the above formulas. In this case, if it is taken that the total noise power is represented equivalently by the average of the standard deviations $\sigma_m$ and $\sigma_s$ of the noise expressed by the formulas (4-a) and (4-b), then SNR can be derived as:

$$SNR = \left[\frac{(I_m - I_s)}{(\sigma_m + \sigma_s)/2}\right]^2 \quad (5)$$

It can be seen from Formula (5) that when the optical power $P_n$ input into the SOA modulator 91 is small, the beat noise between spontaneous emissions is the governing factor in SNR deterioration. It can be understood that in order to suppress SNR deterioration, it is sufficient to reduce the bandwidth $B_e$ of the optical receiver 94. That is, this corresponds to reducing the bit rate at which the signals are transmitted. Therefore, the transmittable bit rate relative to the optical power input into the SOA modulator 91 is analytically calculated. In order to simplify the calculation, noise generated by the optical receiver 94 (shot noise and thermal noise in Formulas (4-a) and (4-b)) is ignored, and the calculation is made with the quantum efficiency as 1 and the extinction ratio as 0. If the bandwidth Be of the optical receiver 94 is required to be equivalent to 0.7 times the bit rate B, and if the input optical power into the SOA modulator 91 necessary for obtaining an SNR that equals 200 ($10^{-12}$ in bit-error rate conversion) is taken as $P_{in}$, then this can be expressed using Formula (5):

$$SNR = \frac{2\left[G\frac{P_{in}}{h\nu} + (G-1)n_{sp}m_p\Delta f\right]^2}{\left\{2G\frac{P_{in}}{h\nu}(G-1)n_{sp} + m_p[(G-1)n_{sp}]^2\Delta f\right\}0.7B} \geq 200, \quad (6)$$

$$B \leq \frac{\left[G\frac{P_{in}}{h\nu} + (G-1)n_{sp}m_p\Delta f\right]^2}{70\left\{2G\frac{P_{in}}{h\nu}(G-1)n_{sp} + m_p[(G-1)n_{sp}]^2\Delta f\right\}}$$

The result calculated when the gain G=15 [dB], the spontaneous emission factor $n_{sp}$=15, the number of polarization mode $m_p$=2, the transmission spectrum full-width at a half-maximum of the optical filter 92 is taken as $\Delta f$=15 [GHz], and the optical frequency $\nu$=200 [THz] is shown in FIG. 12B as an example of the above calculation.

When the input optical power is −35 [dBm] or greater, because beat noise caused by interference between signal light and spontaneous emissions is the governing factor in the SNR deterioration, the transmittable bit rate increases substantially in proportion to the input optical power. In contrast, if the input optical power is −35 [dBm] or less, beat noise caused by interference between spontaneous emissions is the governing factor in the SNR deterioration, and when the input optical power is −50 [dBm] or less, the transmittable bit rate settles at a particular constant value. In a state such as this in which the optical power input into the SOA modulator 91 is low (here, −50 [dBm]), it can be considered that the optical signals are transmitted by a spectrum-slicing scheme.

Note that because the transmittable bit rates given in Formula (6) or in FIG. 12B are the rates when the SOA modulator 91, the optical receiver 94 and the input optical carrier are all ideal, in practice it is possible to derive the actual SNR incorporating every considered noise factor. In addition, if an optical signal is amplified using an optical amplifier when transmitting the optical signal, the noise caused by the optical amplifier may be calculated separately additionally to Formulas (4-a) and (4-b).

As has been described above, it can be understood that the transmission characteristics provided by an SOA modulator depend on the input optical level. Namely, it can be understood that because the transmittable bit rate can be inferred if the level of the light input into the SOA modulator is monitored, it is sufficient if the bit rate of the SOA modulator is varied in accordance with this level of input light.

A detailed description will now be given using FIG. 11 of the optical transceiving packages 60d or 61d. Signals (for example, having a transmission rate of 1.25 Gbps) from a communication terminal (not shown) such as a server or client terminal are taken into an optical communication unit via the bi-directional network interface 11 or 21 (for example, a Gigabit Ethernet). The signals are then sent to the memory 42 via the writing section 41 in the physical bit rate down-converter 14. At the same time, the transmission-rate controller 70 monitors the input optical level $P_n$ of the optical modulator (SOA modulator) 81 using the power monitor 83. A transmittable physical bit rate for the transmission optical signals is then calculated using Formula (6) for the input optical level $P_{in}$ in the transmission rate decision circuit 84. A control signal is then given to the reading section 43 in the physical bit rate down-converter 14 such that signals from the memory 42 are read at the above calculated physical bit rate. Alternatively, it is also possible to store in advance in the transmission rate decision circuit 84 the transmittable physical bit rate for the transmission optical signals for the input optical level $P_{in}$ using Formula (6), and for a control signal showing the physical bit rate for the transmission optical signals corresponding to the optical level $P_n$ input into the optical modulator 81 from the power monitor 83 to be supplied to the reading section 43 inside the physical bit rate down-converter 14. This control signal may, for example, be a clock signal. The reading section 43 in the physical bit rate down-converter 14 reads signals from the memory 42 synchronously with the clock signals supplied from the transmission-rate controller 70. The signals read from the memory 42 are sent to the drive circuit 82 that amplifies their signals and drives the optical modulator 81. The optical modulator 81 converts into optical signals, and they are then transmitted as transmission signals to an opposite optical communication unit (not shown) to which the optical transceiving package is connected via an optical fiber.

Here, the physical bit rate of the transmission optical signals that is decided by the transmission-rate controller 70 may also be set as binary values given below. For example, if the characteristics of the SOA modulator are such as is shown in FIG. 12B, then if the input optical level is −35 dBm or more, the SOA modulator may be driven at 1.25 Gbps, which is the physical bit rate of a Gigabit Ethernet. Moreover, if the input optical power is −35 dBm or less, the SOA modulator may be driven at a fixed transmission rate lower than 430 Mbps, for example, 125 Mbps, which is the physical transmission rate of a Fast Ethernet.

However, in order to receive signals input into the optical transceiving package shown in FIG. 11 from the opposite optical communication unit (not shown) that is connected via the optical fiber, it is sufficient if the following structure is employed. A 3R optical receiver (namely, an optical receiver having the functions of Re-shaping, Re-timing, and Re-generating) for dealing with multiple bit rates may be employed as the optical receiver 72. Optical signals are converted into electrical signals and clock signals are also reproduced by this optical receiver 72. These clock signals 72 are sent to the writing section 41 inside the physical bit rate up-converter 24, and the writing section 41 writes the electrical signals output from the optical receiver 72 to the memory 42 in synchronization with the clock signals. Signals are read from the memory 42 in the physical bit rate up-converter 24 by the reading section 43 at the physical bit rate (1.25 Gbps) of the bi-directional network interface 11 or 21, and are then sent to a communication terminal via this bi-directional network interface.

By forming an optical communication system using the present embodiment, it is possible to continue communication at a low rate between optical communication units even when there is a fault in the light source of the optical transmitter or in the light source that supplies optical carriers to the optical transmitter.

[Sixth Embodiment of the Optical Communication System of the Present Invention]

Figure 13:
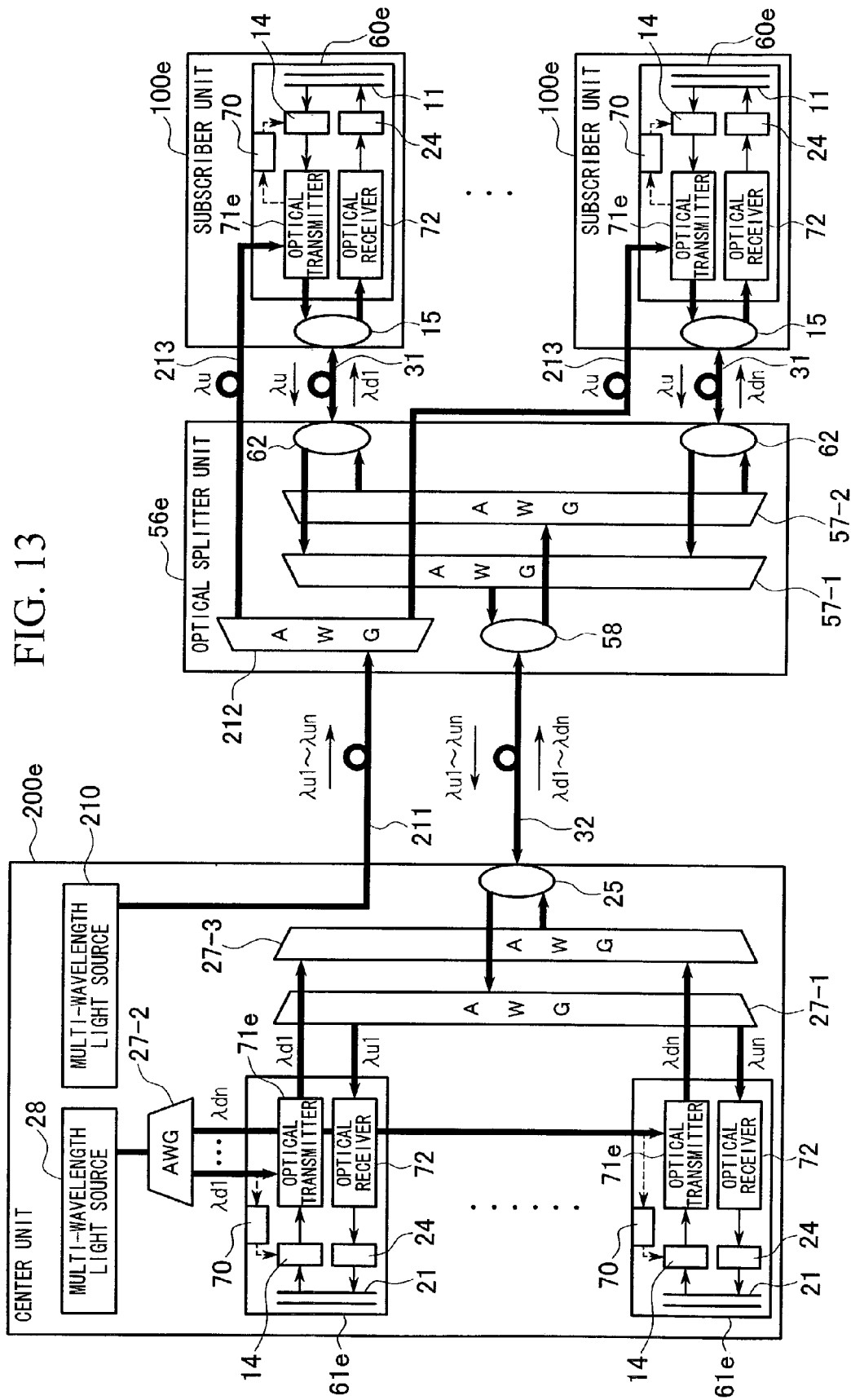
FIG. 13 is a block diagram showing a sixth embodiment of the optical communication system of the present invention.

FIG. 13 shows the sixth embodiment of the optical communication system of the present invention.

The basic structure of the network for transmitting downstream optical signals and upstream optical signals is the same as that shown in FIG. 10 used for describing the fifth embodiment. However, in the present embodiment, in the center unit 200e there are provided multi-wavelength light sources 28 and 210 for supplying optical carriers to the optical transceiving packages 61e and 60e in the center unit 200e and each subscriber unit 100e. Moreover, an optical fiber 211 that is different from the optical fiber 32 along which downstream optical signals and upstream signals are transmitted is provided between the center unit 200e and the optical splitter unit 56e. In addition, an AWG 212 for demultiplexing optical carriers is provided in the optical splitter unit 56e. Furthermore, optical fibers 213 for supplying optical carriers (and that are different from the optical fibers 31 along which downstream optical signals and upstream signals are transmitted) are provided between each subscriber unit 100e and the optical splitter unit 56e.

Figure 14:
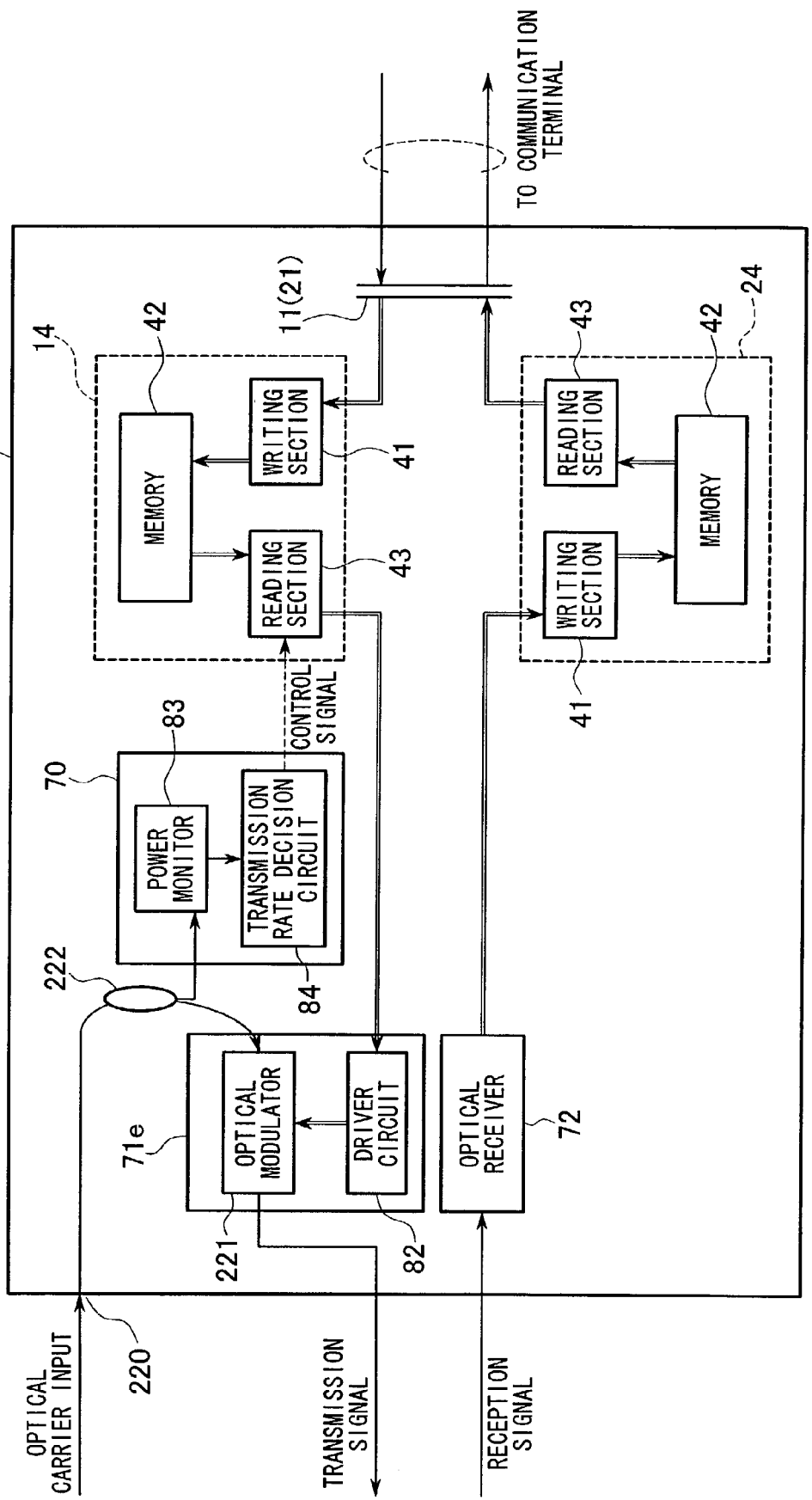
FIG. 14 is a diagram showing a structural example of an optical transceiving package in the sixth embodiment.

The structure shown in FIG. 14 may be employed for the optical transceiving packages 61e and 60e in the center unit 200e and the subscriber units 100e used in the above described optical communication system. The optical transceiving package shown in FIG. 14 is substantially the same as that shown in FIG. 11; however, it differs from the structure shown in FIG. 11 in the following points. Namely, in that because optical carriers are supplied from a light source provided externally to the optical transceiving package, this optical transceiving package has an optical carrier input port 220; in that the optical transmitter 71 is formed only by an optical modulator 221 that is also capable of generating light itself and by a drive circuit 82 that drives the optical modulator 221; and in that there is also provided an optical coupler 222 that divides the optical carriers in two directions and outputs them to the optical modulator 221 and the power monitor 83. The flow of signals inside the optical transceiving packagers is the same as is described for the fifth embodiment.

Returning to FIG. 13, multi-wavelength optical carriers sent out from the multi-wavelength light source 28 for downstream optical signals are demultiplexed by the AWG 27-2, and are then guided to the optical modulator 221 via the respective optical carrier input port 220 and the optical coupler 222 (FIG. 14) of the plurality of optical transceiving packages 61e inside the center unit 200e. In contrast, multi-wavelength optical carriers sent out from the multi-wavelength light source 210 for upstream optical signals are transmitted along an optical fiber 211 that is different from the optical fiber 32 along which the upstream and downstream optical signals are transmitted, so as to arrive at the optical splitter unit 56e. Thereafter, they are demultiplexed into optical carriers of the respective wavelengths by the AWG 212 provided in the optical splitter unit 56e, and are sent to the respective subscriber unit 100e via the optical fiber 213 that is different from the optical fiber 31 along which the upstream and downstream optical signals are transmitted. The optical carriers are then guided to the optical modulator 221 via the optical carrier input port 220 (FIG. 14) of the optical transceiving package 60e inside each subscriber unit 100e.

Note that in FIG. 13 a structure is shown in which three AWG are provided in the optical splitter unit 56e; however, a structure may also be employed in which two or only one AWG is provided with the AWG 212 for demultiplexing optical carriers combined with another AWG.

Moreover, in FIG. 13, the optical fibers 32 and 31 between the center unit 200e and the optical splitter unit 56e and between the optical splitter unit 56e and the subscriber units 100e, which are the optical fibers along which the downstream optical signals and upstream optical signals are transmitted, are each single optical fibers by using wavelength-division multiplexing filters (WDM filters) 25, 58, 62, and 15; however, in the same way as is shown in FIG.

5, it is also possible to use one optical fiber each for both the downstream optical signals and the upstream optical signals. Furthermore, when one optical fiber for the signal light is used for the upstream optical signals and one optical fiber for the signal light is used for the downstream optical signals, it is also possible for the optical carriers for the upstream optical signals to be multiplexed and transmitted on the optical fiber used for transmitting the downstream signals. In this case, two optical fibers are sufficient between the center unit 200e and the optical splitter unit 56e, and two optical fibers are sufficient between the optical splitter unit 56e and each of the subscriber units 100e.

By forming an optical communication system using the present embodiment, it is possible to continue communication at a low rate even when there is a fault in the light source of the optical transmitter or in the multi-wavelength light source. Moreover, it is also possible to continue communication at a low rate between the center unit 200e and each subscriber unit 100e even when there is a wavelength shift of the light source of the optical transmitter or in the multi-wavelength light source.

[Seventh Embodiment of the Optical Communication System of the Present Invention]

Figure 15:
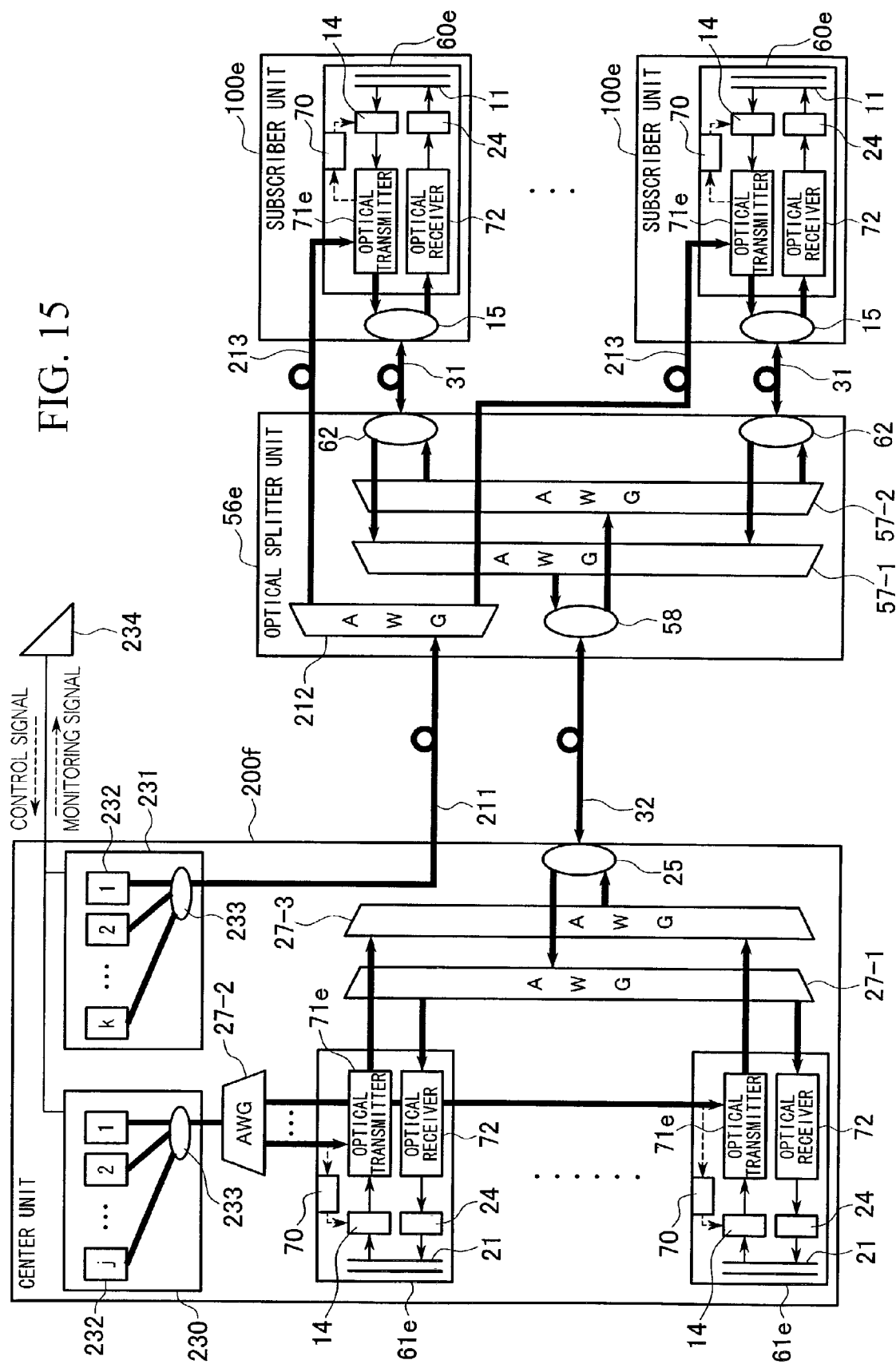
FIG. 15 is a block diagram showing a seventh embodiment of the optical communication system of the present invention.
Figure 16:
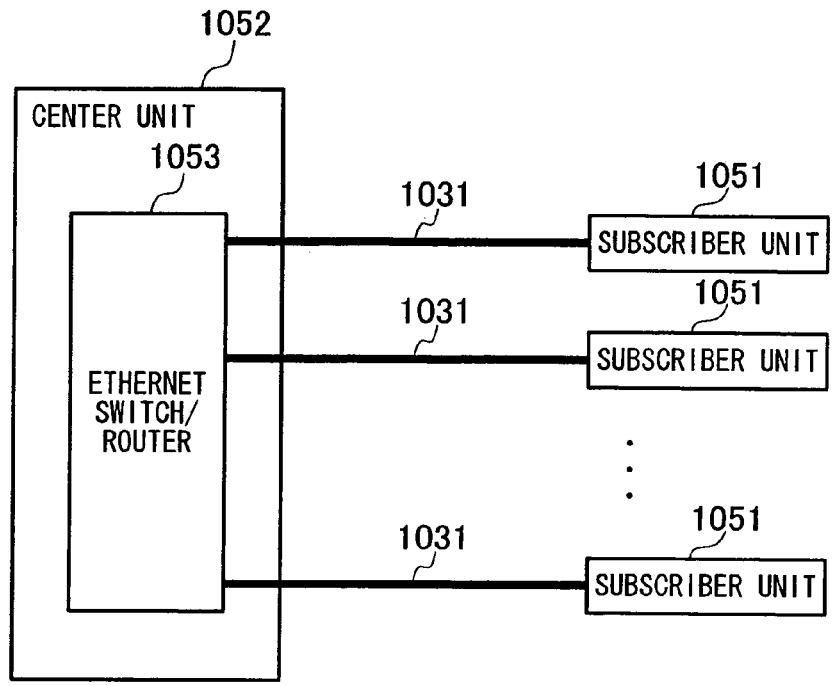
FIG. 16 is a block diagram showing a structural example of an Ethernet-based access system.
Figure 17:
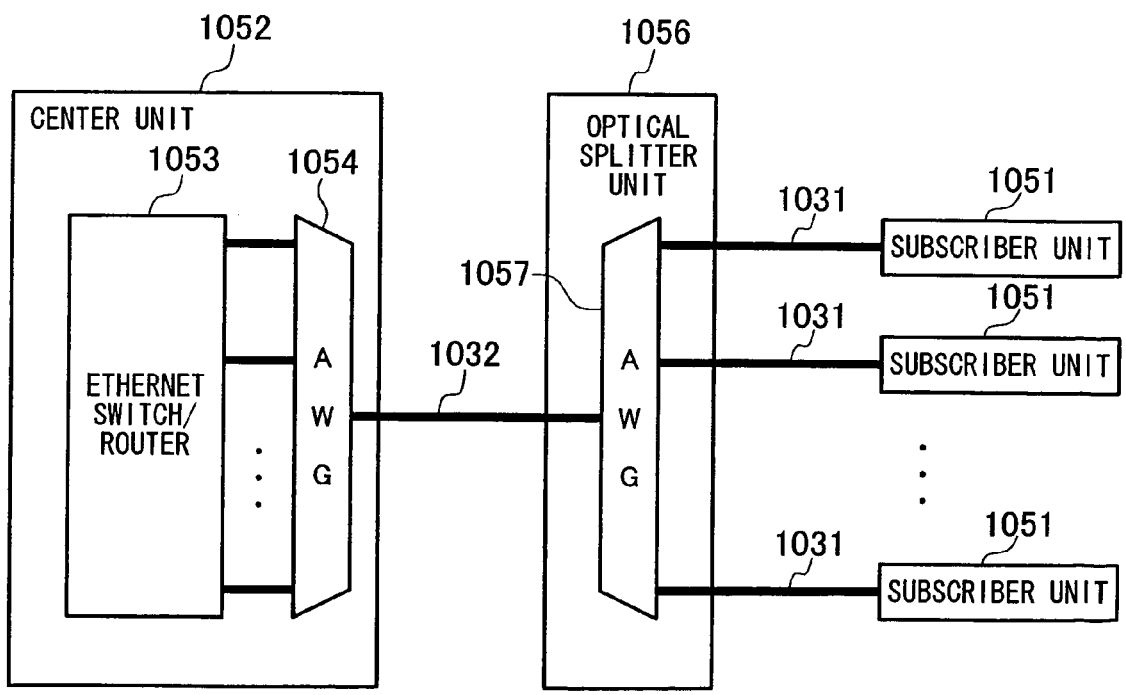
FIG. 17 is a block diagram showing a structural example of a wavelength-division multiplexing access network.
Figure 18:
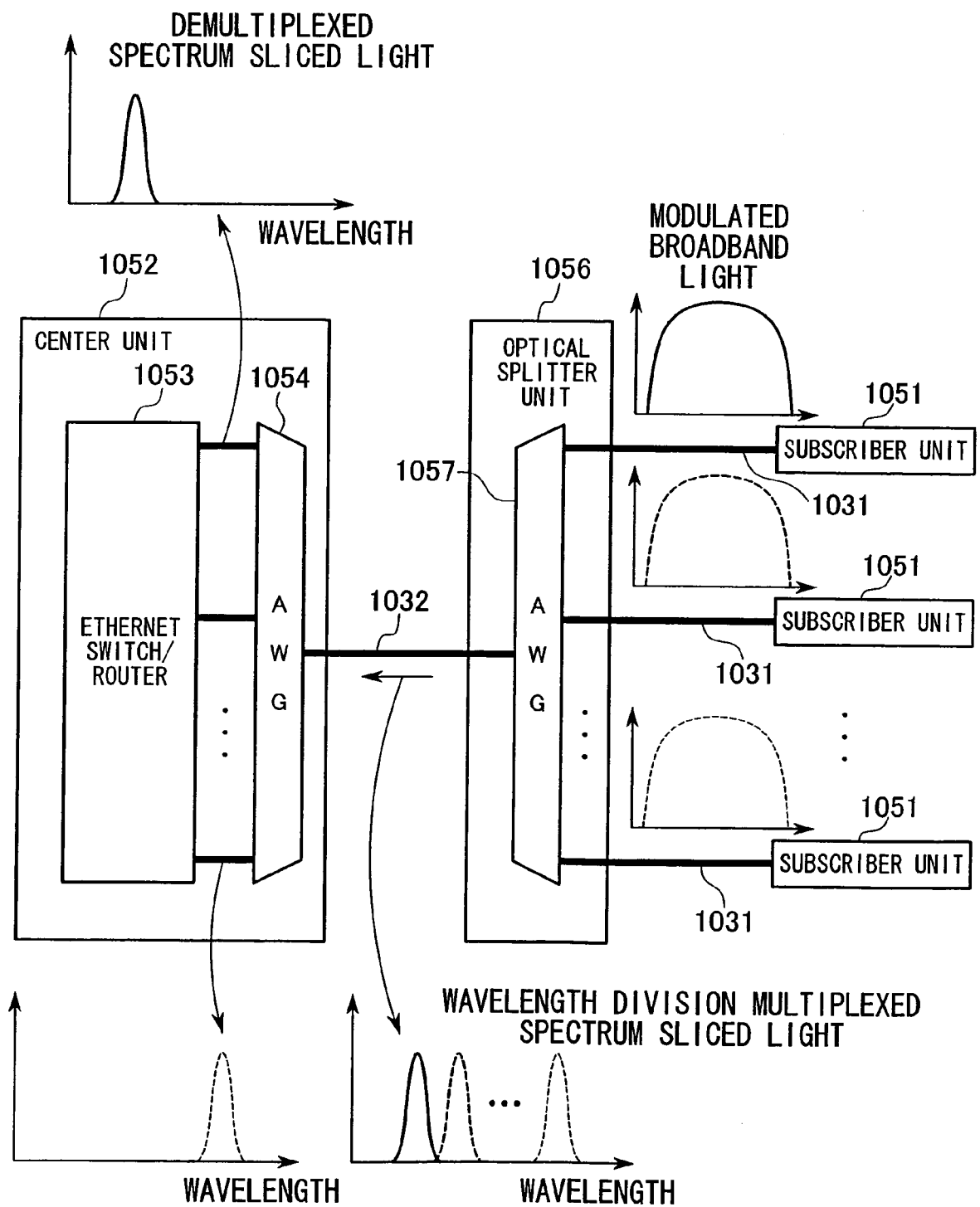
FIG. 18 is a block diagram showing a structural example of a wavelength-division multiplexing access network that uses spectrum-sliced light.
Figure 19:
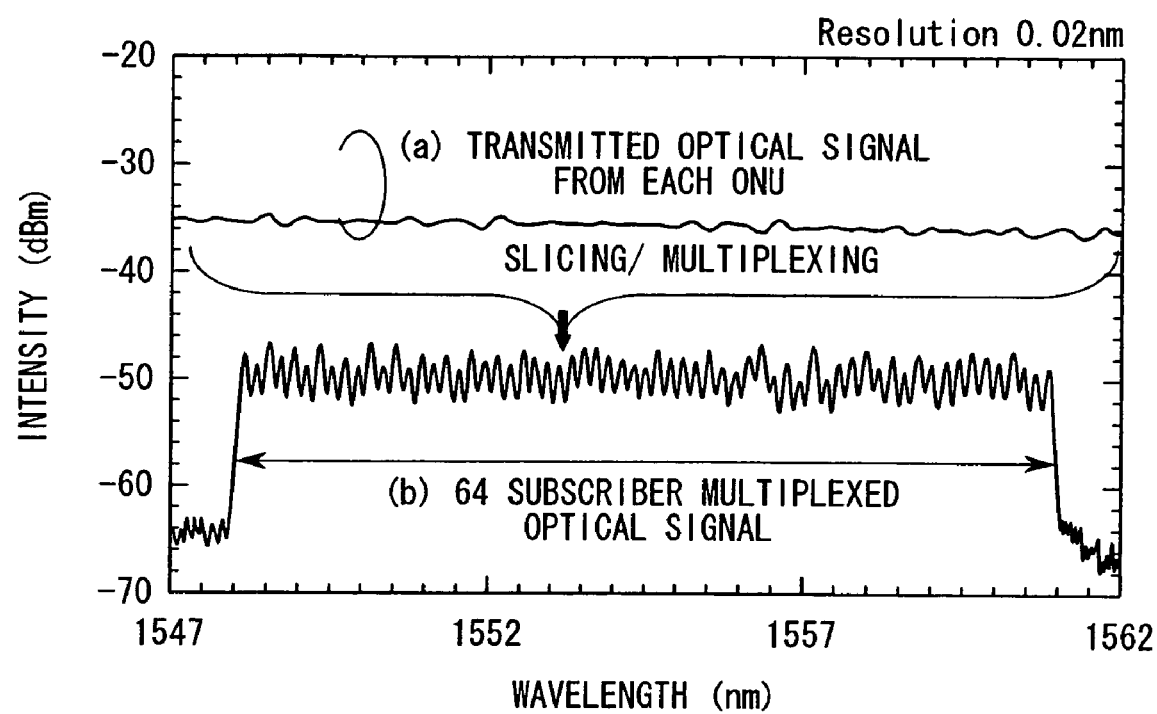
FIG. 19 is a diagram showing a relationship between modulated broadband light and wavelength-division multiplexed spectrum-sliced light.
Figure 20A:
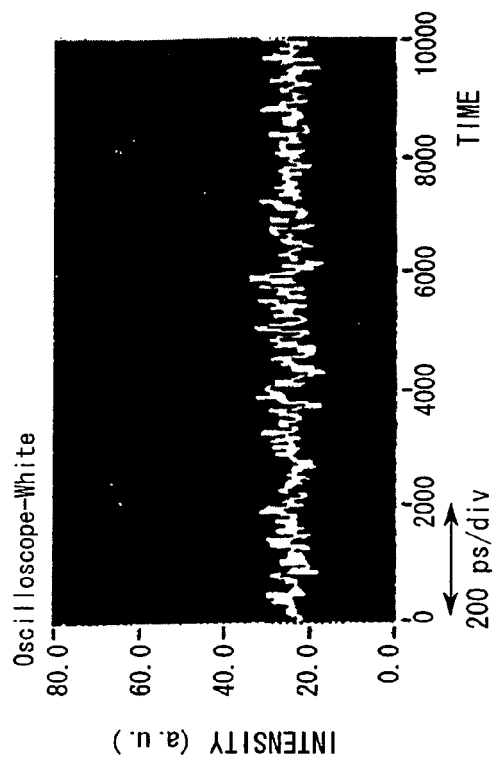
FIGS. 20A to 20D are diagrams for explaining effects of beat noise when spectrum-slicing is used.
Figure 20B:
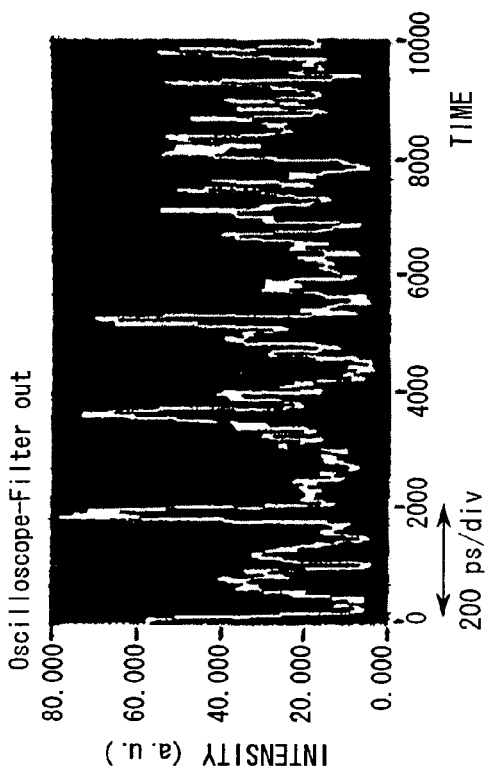
Figure 20C:
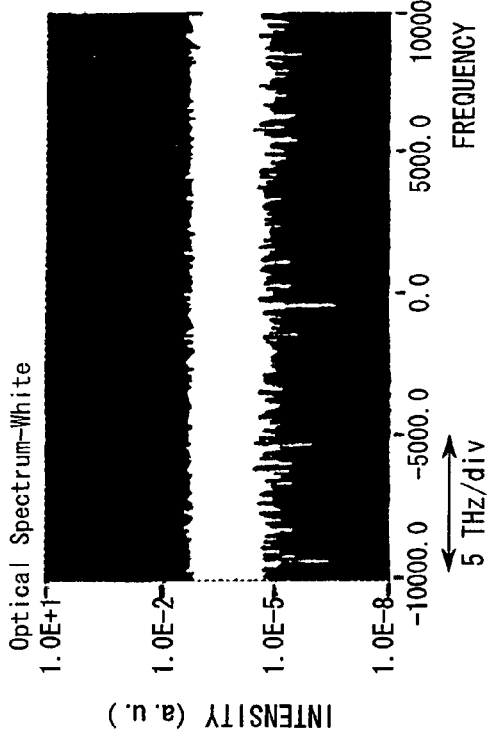
Figure 20D:
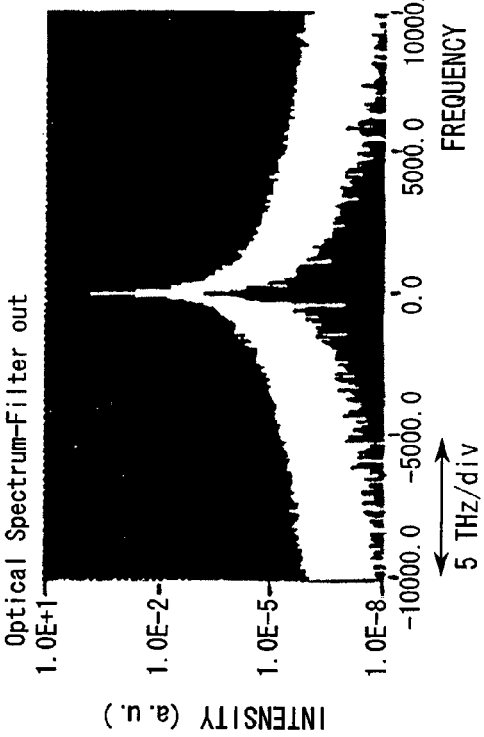
Figure 21:
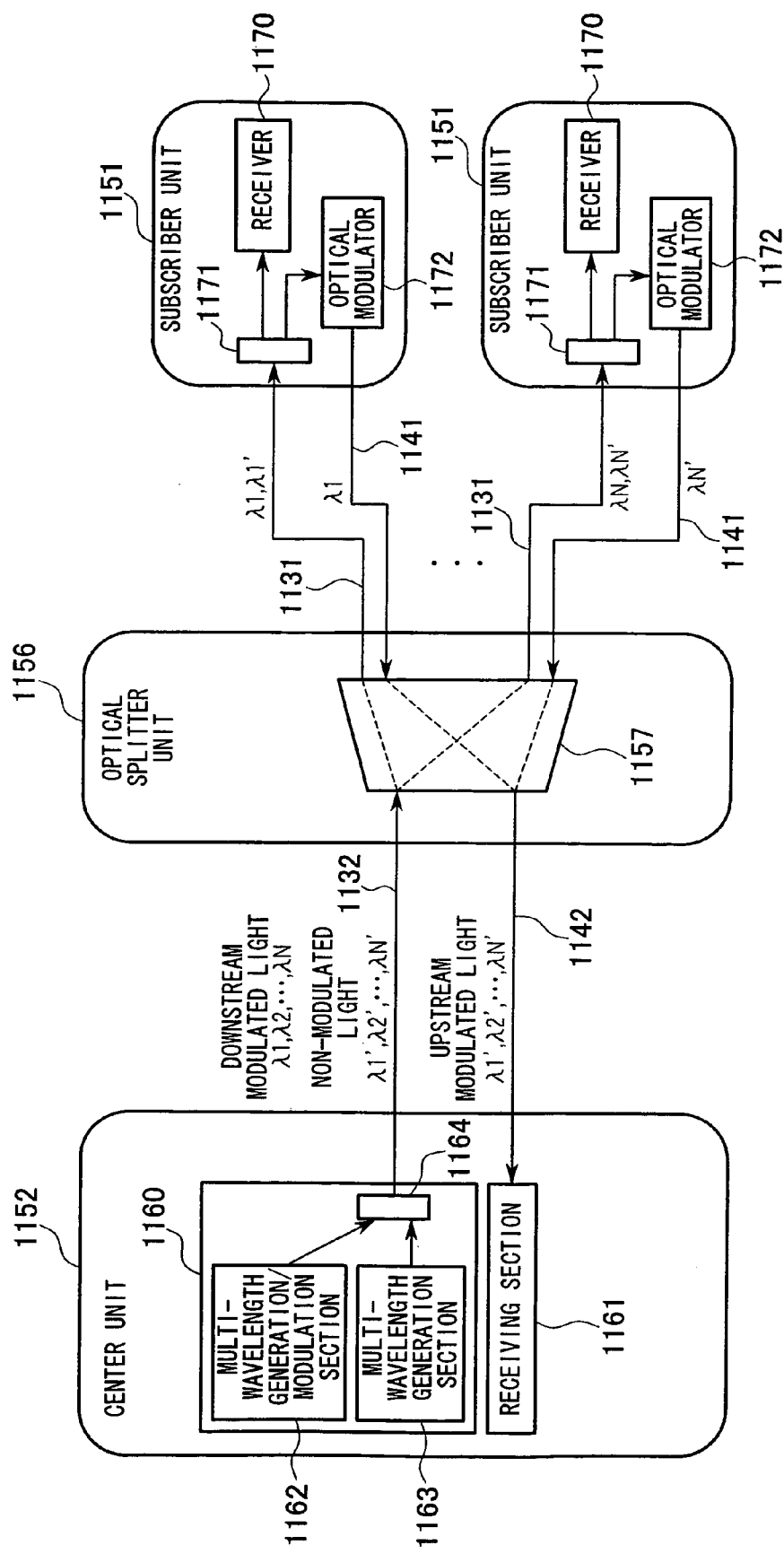
FIG. 21 is a block diagram showing a structural example of a carrier supply type of wavelength-division multiplexing access network.

FIG. 15 shows the seventh embodiment of the optical communication system of the present invention.

The present embodiment differs from that shown in FIG. 13, which was used in the description of the sixth embodiment, in that instead of the multi-wavelength light source the tunable multi-wavelength light source described below is used. The optical transceiving packages, the AWG, and the optical fibers in the center unit 200f and the subscriber units 100f may have the same structure as those used in the sixth embodiment (FIG. 13).

A tunable multi-wavelength light source 230 for downstream signals and a tunable multi-wavelength light source 231 for upstream signals are provided in the center unit 200f. Both the tunable multi-wavelength light sources 230 and 231 are formed by from one to a plurality of tunable laser light sources 232 that are fewer in number than the number of subscriber units 100 used in the optical communication system of the present embodiment, and by a multiplexer 233 that multiplexes laser light output from the tunable laser light sources 232 and then outputs the multiplexed light. An optical coupler, for example, may be used for the multiplexer 233.

The switching on and off of the optical outputs of each of the tunable laser light sources 232 built into the tunable multi-wavelength light sources 230 and 231 is controlled by a control unit 234. Moreover, the wavelength is also controlled when the optical output is switched on. It is also possible for the wavelength to be changed dynamically. By turning on the optical outputs of all the tunable laser light sources 232, it is possible to make the tunable multi-wavelength light sources 230 and 231 generate the same number of optical carriers at maximum as the inbuilt tunable laser light sources 232.

Multi-wavelength optical carriers output from the tunable multi-wavelength light source 230 for downstream signals are demultiplexed into the respective wavelengths by the AWG 27-2 provided in the center unit 200f. They are then guided to the optical modulator 221 through the optical carrier input port 220 (FIG. 14) of the optical transceiving package 61e inside the center unit 200e respectively. They are then modulated by the optical modulator 221 and are transmitted to the multiplexing AWG 27-3. However, because the number of optical carriers distributed to the optical receiving packages 61e is fewer than the number of optical transceiving packages 61e installed in the center unit 200f, it will be obvious that optical carriers are not distributed to all of the optical transceiving packages 61e. Moreover, because there are also cases when the wavelengths of the optical carriers transmitted from the tunable multi-wavelength light source 232 change with time, the supply of optical carriers to a particular optical transceiving package 61 may be stopped. In an optical transceiving package 61e to which no optical carriers are supplied like this, the transmission-rate controller 70 provided in the optical transceiving package 61e lowers the transmission rate and the optical transmitter 71e provided in the optical transceiving package 61e emits the modulated broadband light. In this way, downstream signals in which single wavelength optical carriers are modulated at a high rate, or downstream signals in which broadband light is modulated at a low rate are sent from each optical transceiving package 61e to the AWG 27-3 for multiplexing that is provided in the center unit 200f. These downstream signals are then wavelength-division multiplexed by the AWG 27-3, and are sent to the optical splitter unit 56e via the optical fiber 32. In the optical splitter unit 56e the wavelength-division multiplexed downstream optical signals are demultiplexed, and downstream optical signals are transmitted to the respective subscriber units 100e via the optical fibers 31. These downstream optical signals are then received by the optical receiver 72 in the subscriber units 100e, and the received electrical signals are sent to the bi-directional network interface 11 via the physical bit rate up-converter 24 of the subscriber unit 100e.

Multi-wavelength optical carriers output from the tunable multi-wavelength light source 231 for upstream signals are distributed from the center unit 100f through the optical splitter unit 56e to the respective subscriber units 100e via an optical fiber 211 that is different from the optical fiber 32 along which modulation signals are transmitted and optical fibers 213 that are different from the optical fibers 31 along which downstream optical signals and upstream optical signals are transmitted. However, in the same manner as for the downstream signals, because optical carriers are not distributed to the optical transceiving packages 60e of all of the subscriber units 100e, in the optical transceiving packages 60e to which optical carriers are supplied, the optical carriers are modulated by the optical modulator 221 inside the optical transmitter 71e (FIG. 14), while in the optical transceiving packages 60e to which optical carriers are not supplied, the transmission-rate controller 70 provided in the optical transceiving package 60e lowers the transmission rate and the optical transmitter 71e provided in the optical transceiving package 60e emits the modulated broadband light. In this way, upstream signals in which optical carriers of a single wavelength are modulated at a high rate or upstream signals in which broadband light is modulated at a low rate are transmitted from the respective optical transceiving package, and are sent to the AWG 57-1 for multiplexing provided in the optical splitter unit 56e via the optical fibers 31. After the upstream signals from the respective subscriber units 100e have been wavelength-division multiplexed by the AWG 57-1, they are sent to the center unit 200f via the optical fiber 32. After they have then been demultiplexed into the respective wavelengths by the AWG 27-1 for demultiplexing that is provided in the center unit 200f, the upstream signals are received by the optical receiver 72 in the optical transceiving package 61e. The received electrical signals are sent to the bi-directional network interface 21 via the physical bit rate up-converter 24 of the respective optical transceiving package 61e.

Note that in FIG. 15 a structure is shown in which three AWG are provided in the optical splitter unit 56e; however, a structure may also be employed in which two or only one AWG is provided with the AWG 212 for demultiplexing optical carriers combined with another AWG.

Moreover, in FIG. 15, the optical fibers between the center unit 200f and the optical splitter unit 56e and between the optical splitter unit 56e and the subscriber units 100e, which are the optical fibers along which the downstream optical signals and upstream optical signals are transmitted, are each single optical fibers by using wavelength-division multiplexing filters (WDM filters) 25, 58, 62, and 15; however, in the same way as is shown in FIG. 5, it is also possible to use one optical fiber each for both the downstream optical signals and the upstream optical signals. Furthermore, when one optical fiber for the signal light is used for the upstream optical signals and one optical fiber for the signal light is used for the downstream optical signals, it is also possible for the optical carriers for the upstream optical signals to be multiplexed and transmitted on the optical fiber used for transmitting the downstream signals. In this case, two optical fibers are sufficient between the center unit 200f and the optical splitter unit 56e, and two optical fibers are sufficient between the optical splitter unit 56e and each of the subscriber units 100e.

It is not necessary for the number of tunable laser light sources 232 used in the tunable multi-wavelength light source 230 for downstream signals to be the same as the number of tunable laser light sources 232 used in the tunable multi-wavelength light source 231 for upstream signals (namely, the value of j and the value of k shown in FIG. 15 may be different). Moreover, in FIG. 15 two tunable multi-wavelength light sources 230 and 231 for downstream optical signals and for upstream optical signals are provided in the center unit 200f; however, it is sufficient if only one of these is a tunable multi-wavelength light source.

Here, it is also possible for the tunable multi-wavelength light sources 230 and 231 to be structured so that they can dynamically change the wavelength of their optical carriers through, for example, the process described below.

The tunable multi-wavelength light sources 230 and 231 are connected directly to the control unit 234 using cables, or are connected to the control unit 234 via a network. As a result of the control unit 234 receiving from the tunable multi-wavelength light sources 230 and 231 monitoring signals that show the states (i.e., whether the optical output is on or off, and the wavelength when the optical output is on) of the individual tunable laser light sources 232 housed within the tunable multi-wavelength light sources 230 and 231, it is possible to ascertain the wavelengths of the optical carriers transmitted by the tunable multi-wavelength light sources 230 and 231. Moreover, as a result of the control unit 234 transmitting control signals to allow the turning on and off as well as the wavelengths of the optical output of each of the tunable laser light sources 232 to be controlled both individually and from a remote position, it is possible to control the wavelengths of the tunable multi-wavelength light sources 230 and 231 from a remote position.

The control signals from the control unit 234 may be transmitted, for example, using the procedure described below.

An operator terminal (not shown) is connected to the control unit 234. If a command such as "supply an optical carrier used in communication to a particular subscriber" is input into the control unit 234 via this operator terminal, the control unit 234 senses monitoring signals from the tunable multi-wavelength light sources 230 and 231, and searches for a tunable laser light source 232 in which the optical output is turned off. Next, the wavelength of the optical carrier used by the relevant subscriber unit 100e for communication is decided from a corresponding table stored in the control unit 234 that contains each subscriber unit 100e and the wavelength of the optical carrier used by that subscriber unit 100e for communication. A control signal is then output to the above tunable laser light source 232 such that the tunable laser light source 232 oscillates at that wavelength.

In the above example, if there is no tunable laser light source 232 whose optical output is turned off, a single tunable laser light source may be selected at random from among all of the housed tunable laser light sources 232 and the wavelength thereof switched. Moreover, it is also possible to allot an order of priority to each subscriber unit 100e in advance, and to switch the wavelength of the tunable laser light source 232 being used for communication by the subscriber unit 100e having the lower order of priority. Alternatively, the data traffic communicated by each subscriber unit 100e may be monitored in the bi-directional network interface 21, and the wavelength switched of the tunable laser light source 232 being used for communication by the subscriber unit 100e having the least amount of data traffic.

The above described control signal transmission procedure is applicable to cases such as when, for example, there is a request to a communication carrier from a customer currently using a low rate communication service for the opening of a higher rate communication service. In this case, it is possible to provide a higher rate communication service to a customer in which the communication rate of the subscriber unit 100e of the relevant subscriber 100 is switched, without the structure of the optical communication unit being changed and without the communication being stopped.

It is also possible for control signals from the control unit 234 to be transmitted by another procedure, which is described below.

The times each subscriber unit 100e requires an optical carrier are stored in advance in the control unit 234. When such a time arrives the control unit 234 automatically senses monitoring signals from the tunable multi-wavelength light sources 230 and 231, and searches for a tunable laser light source 232 in which the optical output is turned off. Next, the wavelength of the optical carrier used by the relevant subscriber unit 100e for communication is decided from a corresponding table stored in the control unit 234 containing each subscriber unit 100e and the wavelength of the optical carrier used by that subscriber unit 100e. A control signal is then output to the tunable laser light source 232 that has been discovered, such that this tunable laser light source 232 oscillates at that wavelength.

In the above example, if there is no suspended tunable laser light source 232 whose optical output is turned off, in the same procedure as in the previous example, it is possible to forcibly switch the wavelength of a tunable laser light source 232 that is currently in use.

If a control signal transmission procedure such as that described above is used, it is possible to provide a high rate communication service with a limited time for each customer. For example, a particular customer may use a high rate communication service from 9:00 am to 5:00 pm in a single day, and use a low rate service outside those hours.

As a further example, it is also possible for a control signal from the control unit 234 to be transmitted, for example, using the procedure described below.

A structure (not shown) is formed in which the communication traffic of each subscriber unit 100e is monitored by the bi-directional network interface 21 or by a communication node (a switching hub or the like) connected to the bi-directional network interface 21, and the resulting information can be transmitted to the control unit 234. Note that this type of structure can easily be achieved using existing schemes. A threshold value for the communication traffic for the optical carrier required by each subscriber unit 100e is stored in advance in the control unit 234, and if this threshold value is exceeded the control unit 234 senses monitoring signals from the tunable multi-wavelength light sources 230 and 231, and searches for a tunable laser light source 232 in which the optical output is turned off. Next, the wavelength of the optical carrier used by the relevant subscriber unit 100e for communication is decided from a corresponding table stored in the control unit 234 containing each subscriber unit 100e and the wavelength of the optical carrier used by that subscriber unit 100e. A control signal is then output to the tunable laser light source that has been discovered, such that this tunable laser light source oscillates at that wavelength.

In the above example, if there is no suspended tunable laser light source whose optical output is turned off, in the same procedure as in the previous example, it is possible to forcibly switch the wavelength of a tunable laser light source 232 that is currently in use. Note that, in the reverse of the description given above, it is also possible to remove the above wavelength allocation when the communication traffic falls below the threshold value, and to allocate this wavelength to another subscriber unit 100e when the communication traffic exceeds the threshold value.

If a control signal transmission procedure such as that described above is used, it is possible to provide a high rate communication service that corresponds to the communication traffic known as bandwidth-on-demand.

By forming an optical communication system that uses the present embodiment as described above, there is no longer any need to provide the same number of light sources as there are subscriber units in the center unit; therefore, it is possible to reduce the number of laser light sources in the overall system and to provide a customer with communication at a high bit rate at low cost. In addition, it is also possible to continue communication at a low rate even when there is a fault in the tunable multi-wavelength light source.

In each of the above described embodiments, examples are shown in which the communication interface is a Gigabit Ethernet and the lowered physical bit rate is the physical bit rate of a Fast Ethernet; however, it is also possible to use, for example, a 10 gigabit Ethernet as the communication interface, and to use, for example, a Gigabit Ethernet or a 10 Megabit Ethernet as the lowered physical bit rate.

What is claimed is:

1. An optical communication system, comprising:
a plurality of subscriber side optical communication units that each has a subscriber side bi-directional network interface in which a physical bit rate of transmission signals and a physical bit rate of reception signals are identical, a subscriber side optical transmitter, a subscriber side optical receiver, and a subscriber side physical bit rate down-converter that lowers a physical bit rate of a transmission signal that is input from the subscriber side bi-directional network interface, and outputs the transmission signal to the subscriber side optical transmitter;
a center side optical communication unit having a center side bi-directional network interface in which a physical bit rate of transmission signals and a physical bit rate of reception signals are identical, a plurality of center side optical transmitters and a plurality of center side optical receivers that correspond respectively to the plurality of subscriber side optical communication units, a wavelength multiplexing and demultiplexing section that performs wavelength-division multiplexing on optical signals output from the plurality of center side optical transmitters, the optical signals having different wavelengths from each other and each of the optical signals having a single wavelength, and transmits the multiplexed optical signals as downstream wavelength-division multiplexed optical signals, and demultiplexes into respective wavelengths input upstream wavelength-division multiplexed optical signals and causes the demultiplexed upstream signals to be received in the plurality of center side optical receivers, and a center side physical bit rate up-converter that raises a physical bit rate of a reception signal that is received by the center side optical receiver, and outputs the reception signal to the center side bi-directional network interface; and
an optical splitter unit that is connected via at least one optical fiber to both the plurality of subscriber side optical communication units and the center side optical communication unit, and multiplexes optical signals from the plurality of subscriber side optical communication units and transmits the multiplexed optical signals to the center side optical communication unit as the upstream wavelength-division multiplexed optical signals, and that demultiplexes into respective wavelengths the downstream wavelength-division multiplexed optical signals from the center side optical communication unit and transmits the demultiplexed downstream signals to the plurality of subscriber side optical communication units,
wherein each of the subscriber side optical transmitters is provided with a broadband light source that generates spontaneous emissions, and transmits modulated broadband light obtained by modulating the spontaneous emissions using transmission signals that are input via the subscriber side physical bit rate down-converter and that are at a lower rate than transmission signals output from the subscriber side bi-directional network interface, and
wherein the optical splitter unit spectrally slices the modulated broadband light using respectively different wavelengths that correspond to the subscriber side optical communication units, and performs wavelength-division multiplexing on the spectrum-sliced light of each wavelength and transmits the multiplexed light to the center side optical communication unit.

2. The optical communication system according to claim 1, wherein each of the center side optical transmitters is provided with: a multi-wavelength generation section that outputs optical carriers each having a different wavelength; and a plurality of optical modulators that transmit the optical signals after modulating the optical carriers of each wavelength using a plurality of downstream signals addressed to the plurality of subscriber side optical communication units that are input from the center side bi-directional network interface.

3. An optical communication system, comprising:
a plurality of subscriber side optical communication units that each has a subscriber side bi-directional network interface in which a physical bit rate of transmission signals and a physical bit rate of reception signals are identical, a subscriber side optical transmitter, a subscriber side optical receiver, and a subscriber side physical bit rate down-converter that lowers a physical bit rate of a transmission signal that is input from the subscriber side bi-directional network interface, and outputs the transmission signal to the subscriber side optical transmitter;

a center side optical communication unit having a center side bi-directional network interface in which a physical bit rate of transmission signals and a physical bit rate of reception signals are identical, a plurality of center side optical transmitters and a plurality of center side optical receivers that correspond respectively to the plurality of subscriber side optical communication units, a wavelength multiplexing and demultiplexing section that performs wavelength-division multiplexing on optical signals output from the plurality of center side optical transmitters and transmits the multiplexed optical signals as downstream wavelength-division multiplexed optical signals, and demultiplexes into respective wavelengths input upstream wavelength-division multiplexed optical signals and causes the demultiplexed upstream signals to be received in the plurality of center side optical receivers, and a center side physical bit rate up-converter that raises a physical bit rate of a reception signal that is received by the center side optical receiver, and outputs the reception signal to the center side bi-directional network interface; and an optical splitter unit that is connected via at least one optical fiber to both the plurality of subscriber side optical communication units and the center side optical communication unit, and multiplexes optical signals from the plurality of subscriber side optical communication units and transmits the multiplexed optical signals to the center side optical communication unit as the upstream wavelength-division multiplexed optical signals, and that demultiplexes into respective wavelengths the downstream wavelength-division multiplexed optical signals from the center side optical communication unit and transmits the demultiplexed downstream signals to the plurality of subscriber side optical communication units, wherein the subscriber side optical communication unit is further provided with: a subscriber side physical bit rate up-converter that raises a physical bit rate of reception signals received by the subscriber side optical receiver and outputs the reception signals to the subscriber side bi-directional network interface; and a subscriber side transmission-rate controller that controls a physical bit rate to be lowered by the subscriber side physical bit rate down-converter, and wherein the center side optical communication unit is further provided with: a center side physical bit rate down-converter that lowers a physical bit rate of transmission signals input from the center side bi-directional network interface and outputs the transmission signals to the center side optical transmitter; and a center side transmission-rate controller that controls a physical bit rate to be lowered by the center side physical bit rate down-converter.

4. The optical communication system according to claim 3, wherein the center side optical communication unit is provided with a multi-wavelength generation section that outputs optical carriers each having a different wavelength; and wherein the subscriber side optical communication unit and the center side optical communication unit are provided with an input port into which the optical carriers are input; and wherein each of the subscriber side optical transmitters and the center side optical transmitters are provided respectively with a subscriber side optical modulator and a center side optical modulator, and when the subscriber side optical modulator and the center side optical modulator are each receiving the optical carriers that are input via the input port from the multi-wavelength generation section, the subscriber side optical modulator and the center side optical modulator modulate the optical carriers and transmit optical transmission signals, and when the supply of optical carriers is stopped, the subscriber side optical modulator and the center side optical modulator themselves generate light, and transmit optical transmission signals.

5. The optical communication system according to claim 3, wherein the center side optical communication unit is provided with: a tunable multi-wavelength light source that has one or a plurality of tunable lasers and that outputs wavelength-tunable optical carriers that each has a different wavelength; and a control unit that decides each of the subscriber side optical communication units to which each of the optical carriers should be supplied, and sets wavelengths corresponding to the decided subscriber side optical communication units as wavelengths of the optical carriers to be output by the tunable multi-wavelength light source, and wherein the subscriber side optical communication unit and the center side optical communication unit are provided with an input port into which the optical carriers are input, and wherein each of the subscriber side optical transmitters and the center side optical transmitters are provided respectively with a subscriber side optical modulator and a center side optical modulator, and when the subscriber side optical modulator and the center side optical modulator are each receiving the optical carriers via the input port from the tunable multi-wavelength light source, the subscriber side optical modulator and the center side optical modulator modulate the optical carriers and transmit optical signals, and when the supply of optical carriers is stopped, the subscriber side optical modulator and the center side optical modulator themselves generate light, and transmit optical signals.

6. An optical communication unit, comprising:

a bi-directional network interface in which a physical bit rate of transmission signals and a physical bit rate of reception signals are identical;

an optical receiver that receives input optical signals, each of the input optical signals having a single wavelength, and outputs reception signals to the bi-directional network interface;

a physical bit rate down-converter that lowers a physical bit rate of transmission signals input from the bi-directional network interface by writing the transmission signals into a memory and reading the transmission signals stored in the memory at a rate slower than the rate of writing of the transmission signals into the memory and then outputs the transmission signals; and an optical transmitter that converts the signals input from the physical bit rate down-converter into optical transmission signals and transmits the converted optical transmission signals, wherein the optical transmitter is provided with a broadband light source that generates spontaneous emissions, and transmits modulated broadband light obtained by modulating the spontaneous emissions using transmission signals that are input via the physical bit rate down-converter and that are at a lower rate than transmission signals output from the bi-directional network interface.

7. An optical communication unit, comprising:
a bi-directional network interface in which a physical bit rate of transmission signals and a physical bit rate of reception signals are identical;
an optical receiver that receives input optical signals and outputs reception signals to the bi-directional network interface;
a physical bit rate down-converter that lowers a physical bit rate of transmission signals input from the bi-directional network interface by writing the transmission signals into a memory and reading the transmission signals stored in the memory at a rate slower than the rate of writing of the transmission signals into the memory and then outputs the transmission signals;
an optical transmitter that converts the signals input from the physical bit rate down-converter into optical transmission signals and transmits the converted optical transmission signals;
a physical bit rate up-converter that raises a physical bit rate of reception signals received by the optical receiver and outputs the reception signals to the bi-directional network interface; and
a transmission-rate controller that controls a physical bit rate to be lowered by the physical bit rate down-converter.

8. An optical communication unit, comprising:
a bi-directional network interface in which a physical bit rate of transmission signals and a physical bit rate of reception signals are identical;
a plurality of optical transmitters, each optical transmitter converting the signals input from the bi-directional network interface into optical transmission signals and transmitting the converted optical transmission signals;
a plurality of optical receivers, each optical receiver receiving input optical signals and outputting reception signals;
a physical bit rate up-converter that raises a physical bit rate of reception signals received by the optical receiver by writing the reception signals into a memory and reading the reception signals stored in the memory at a rate faster than the rate of writing of the reception signals into the memory and then outputs the reception signals to the bi-directional network interface; and
a wavelength-division multiplexing and demultiplexing section that performs wavelength-division multiplexing on optical signals output from the plurality of optical transmitters, the output optical signals having different wavelengths to each other and each of the output optical signals having a single wavelength, and transmits the multiplexed optical signals, and demultiplexes into respective wavelengths input upstream wavelength-division multiplexed optical signals obtained by spectrally slicing modulated broadband light and by performing wavelength-division multiplexing on spectrum-sliced light of each wavelength and causes the demultiplexed optical signals to be received in the plurality of optical receivers,
wherein the plurality of optical transmitters are provided with: a multi-wavelength generation section that outputs optical carriers each having a different wavelength; and a plurality of optical modulators that transmit the optical signals after modulating the optical carriers of each wavelength using a plurality of downstream signals addressed to the plurality of optical communication units that are input from the bi-directional network interface.

9. An optical communication unit, comprising:
a bi-directional network interface in which a physical bit rate of transmission signals and a physical bit rate of reception signals are identical;
an optical transmitter that converts the signals input from the bi-directional network interface into optical transmission signals and transmits the converted optical transmission signals;
an optical receiver that receives input optical signals and outputs reception signals;
a physical bit rate up-converter that raises a physical bit rate of reception signals received by the optical receiver by writing the reception signals into a memory and reading the reception signals stored in the memory at a rate faster than the rate of writing of the reception signals into the memory and then outputs the reception signals to the bi-directional network interface;
a physical bit rate down-converter that lowers a physical bit rate of transmission signals input from the bi-directional network interface and outputs the transmission signals to the optical receiver; and
a transmission-rate controller that controls a physical bit rate to be lowered by the physical bit rate down-converter.

10. An optical communication unit according to claim 9, further comprising: a multi-wavelength generation section that outputs optical carriers each having a different wavelength; and an input port into which the optical carriers are input, and
wherein the optical transmitter is provided with an optical modulator and when the optical carriers that are input via the input port from the multi-wavelength generation section is being received, the optical modulator modulates the optical carriers and transmits optical signals, and when the supply of optical carriers is stopped, the optical modulator itself generates light, and transmits optical signals.

11. An optical communication unit according to claim 9, further comprising: a tunable multi-wavelength light source that has one or a plurality of tunable lasers and that outputs wavelength-tunable optical carriers that each has a different wavelength; a control unit that decides each of the optical communication units to which each of the optical carriers should be supplied, and sets wavelengths corresponding to the decided optical communication units as wavelengths of the optical carriers to be output by the tunable multi-wavelength light source; and an input port into which the optical carriers are input; and
wherein the optical transmitter is provided with an optical modulator and when the optical carriers that are input via the input port from the tunable multi-wavelength light source is being received, the optical modulator modulates the optical carriers and transmits optical signals, and when the supply of optical carriers is stopped, the optical modulator itself generates light, and transmits optical signals.

12. An optical transceiving package, comprising:
a bi-directional network interface in which a physical bit rate of transmission signals and a physical bit rate of reception signals are identical;

an optical receiving section that receives input optical signals and outputs reception signals;

a physical bit rate up-converter that raises a physical bit rate of the reception signals received by the optical receiver and then outputs the reception signals to the bi-directional network interface;

a physical bit rate down-converter that lowers a physical bit rate of transmission signals input from the bi-directional network interface and then outputs the transmission signals;

an optical transmitting section that transmits optical signals obtained by modulating optical carriers that have been input from outside the optical transceiving package or have been generated inside the optical transceiving package using transmission signals from the physical bit rate down-converter whose physical bit rate has been lowered; and a transmission-rate controller that controls physical bit rates to be lowered by the physical bit rate down-converter.

* * * * *